United States Patent
Schmelzer et al.

(10) Patent No.: US 11,385,064 B2
(45) Date of Patent: Jul. 12, 2022

(54) DATA GATHERING, ANALYSIS, SCORING, AND RECOMMENDATION SYSTEM FOR COMMUTING

(71) Applicants: Rich Schmelzer, Boulder, CO (US); Esteban Sanchez, Montreal (CA)

(72) Inventors: Rich Schmelzer, Boulder, CO (US); Esteban Sanchez, Montreal (CA)

(*) Notice: Subject to any disclaimer, the term of this patent is extended or adjusted under 35 U.S.C. 154(b) by 0 days.

(21) Appl. No.: 16/598,838

(22) Filed: Oct. 10, 2019

(65) Prior Publication Data
US 2020/0041290 A1 Feb. 6, 2020

Related U.S. Application Data

(63) Continuation of application No. 16/295,606, filed on Mar. 7, 2019, now Pat. No. 10,480,950.

(60) Provisional application No. 62/639,868, filed on Mar. 7, 2018.

(51) Int. Cl.
| | | |
|---|---|---|
| *G01C 21/34* | (2006.01) | |
| *G06Q 10/06* | (2012.01) | |
| *G06Q 50/30* | (2012.01) | |
| *G06Q 40/02* | (2012.01) | |

(52) U.S. Cl.
CPC ..... *G01C 21/3407* (2013.01); *G01C 21/3469* (2013.01); *G01C 21/3484* (2013.01); *G06Q 10/06393* (2013.01); *G06Q 50/30* (2013.01); *G06Q 40/02* (2013.01)

(58) Field of Classification Search
CPC ........... G01C 21/3407; G01C 21/3469; G01C 21/3484; G01C 21/3453; G01C 21/3461; G01C 21/3438; G06Q 10/06393; G06Q 50/30; G06Q 40/02
See application file for complete search history.

(56) References Cited

U.S. PATENT DOCUMENTS

| | | | | |
|---|---|---|---|---|
| 7,606,662 | B2* | 10/2009 | Tengler | G01C 21/3484 |
| | | | | 340/995.19 |
| 8,005,696 | B2* | 8/2011 | de Marcken | G06Q 10/025 |
| | | | | 705/6 |
| 10,408,631 | B2* | 9/2019 | Delaney | G01C 21/3484 |
| 10,480,950 | B2 | 11/2019 | Schmelzer et al. | |
| 2009/0210276 | A1* | 8/2009 | Krumm | G06Q 10/025 |
| | | | | 705/7.33 |

(Continued)

FOREIGN PATENT DOCUMENTS

GB 2551028 A 12/2017

OTHER PUBLICATIONS

Fothergill, Aidan, "Examination Report No. 1 for Standard Patent Application No. 2019230119", dated Jan. 29, 2021, p. 5, Published in: AU.

(Continued)

*Primary Examiner* — Richard M Camby
(74) *Attorney, Agent, or Firm* — Neugeboren O'Dowd PC

(57) ABSTRACT

A method and platform for improving one or more commutes comprises gathering data about one or more metrics of at least one user's commute; analyzing one or more alternate types of commutes available to the at least one user; generating, based on the data about one or more metrics and the analysis of the one or more alternate types of commutes available, one or more recommendations to the at least one user comprising at least one of the one or more alternate types of commutes.

20 Claims, 19 Drawing Sheets

(56) References Cited

U.S. PATENT DOCUMENTS

| | | | |
|---|---|---|---|
| 2013/0311215 A1 | 11/2013 | Rothley et al. | |
| 2014/0122164 A1* | 5/2014 | Lucara | G06Q 10/047 |
| | | | 705/7.28 |
| 2015/0253144 A1* | 9/2015 | Rau | G01C 21/3484 |
| | | | 705/348 |
| 2015/0310467 A1* | 10/2015 | Klampfl | G08G 1/005 |
| | | | 705/7.35 |
| 2016/0034909 A1 | 2/2016 | Zhu et al. | |
| 2017/0200249 A1* | 7/2017 | Ullrich | G06Q 50/30 |
| 2017/0270564 A1 | 9/2017 | Mendiola et al. | |

OTHER PUBLICATIONS

Camby, Richard M., "Office Action Regarding U.S. Appl. No. 16/295,606", dated May 17, 2019, p. 10 Published in: US.

Otero, Vanessa, "Response to Office Action Re U.S. Appl. No. 16/295,606", dated Jun. 6, 2019, p. 10 Published in: US.

Young, Lee W., "International Search Report and Written Opinion Regarding International Application No. PCT/US19/21177", dated Jun. 6, 2019, p. 11 Published in: US.

Black, Thomas, "International Preliminary Report on Patentability Regarding International Application No. PCT/US2019/021177", dated Apr. 1, 2020, p. 18, Published in: US.

Intellectual Property India, "Examination Report Under Sections 12 & 13 of the Patents Act, 1970 and the Patents Rules, 2003 Regarding Application No. 202027041873", dated Apr. 30, 2021, p. 6, Published in: IN.

EPO, "Extended European Search Report Regarding Application No. 19764354.7", dated Aug. 13, 2021, p. 8, Published in: EP.

Acharya, Rajeshkumar, "Response to Office Action dated Apr. 30, 2021 Regarding Application No. 202027041873", dated Oct. 8, 2021, p. 164, Published in: IN.

Fothergill, Aidan, "Examination Report No. 2 for Australian Patent Application No. 2019230119", dated Sep. 20, 2021, p. 5, Published in: AU.

Cale, Andrew, "Response To Office Action Regarding Australian Patent Application No. 2019230119", dated Aug. 31, 2021, p. 19, Published in: AU.

Siddiqi, I, "Office Action Regarding Canadian Patent Application No. 3093226", dated Sep. 24, 2021, p. 4, Published in: CA.

"Mobiliteitsanalyse van MobilityLabel", Hoeveel CO2, reistijd en kosten kan uw organisatie besparen?, Online available at <https://web.archive.org/web/20170422162132/http:/www.mobilitylabel.nl/mobiliteitsanalyse>, 12 pages, retrieved on: May 13, 2022.

"Mobility Label, Info-Sheet", Online available at <https://mobilitylabel.com/mobiliteitsanalyse.pdf>, 2 pages, retrieved on: Apr. 2017.

"Travel CO2 Calculator—Kelionės 002 skaičiuoklė", Youtube, 1 page, Jun. 14, 2013.

Communication pursuant to Rule 114(2) EPC received for European Patent Application Serial No. 19764354.7 dated Apr. 26, 2022, 4 page.

Communication received on Observation by a third party by European Patent Office for European Patent Application Serial No. 19764354.7 dated May 9, 2022, 2 pages.

Examination Report No. 3 received for Australian Patent Application Serial No. 2019230119 dated Jan. 27, 2022, 3 pages.

Schukajlow-Wasjutinski, Stanislaw "Schüler-Schwierigkeiten und Schüler-Strategien beim Bearbeiten von Modellierungsaufgaben als Bausteine einer lernprozessorientierten Didaktik", Humanwissenschaften der Universitat Kassel, 260 pages, Aug. 11, 2010.

Schukajlow-Wasjutinski, Stanislaw "Schüler-Schwierigkeiten und Schüler-Strategien beim Bearbeiten von Modellierungsaufgaben als Bausteine einer lernprozessorientierten Didaktik", Humanwissenschaften der Universitat Kassel, Online Available at <https://kobra.uni-kassel.de/handle/123456789/2010081133992>, 4 pages, retrieved on: Aug. 11, 2010.

* cited by examiner

FIG. 5E

FROM FIG. 5C

What criteria do you care about in your commute?

| 518 | | Response Percent |
|---|---|---|
| Cost | ▆▆▆▆▆ | 24% |
| Time Efficiency | ▆▆ | 14% |
| Convenience | ▆ | 13% |
| Alone Time | ▫ | 11% |

Which of the following modes would you consider

| 519 | | Response Percent |
|---|---|---|
| Cost | ▆▆▆▆▆ | 24% |
| Time Efficiency | ▆▆ | 14% |
| Convenience | ▆ | 13% |
| Alone Time | ▫ | 11% |

TO FIG. 5F

FROM FIG. 5D

| Response Count |
|---|
| 300 |
| 239 |
| 85 |
| 15 |

Do you take advantage of Commuter Benefits? 520

40%  50%

10% of commuters responded "I don't know"

| trying? Response Count |
|---|
| 300 |
| 239 |
| 85 |
| 15 |

FROM FIG. 5E

FIG. 6B

All Locations possible Commuter Score.
to understand possible scenarios.

AVERAGE COST
Current: $342
Optimized: $230

AVERAGE CARBON
Current: 135lbs
Optimized: 110lbs

Subsidy Calculator  603   [Add Subsidy]

$80 Ride sharing within 10 miles  ✕
150 Users            $12,000/month $80 Bikeshare within 5 miles  ✕
150 Users            $12,000/month Total
300 Users            $24,000/month Suggestions  604

[ $ City Subsidy ]

Meet your Rideshare optimization by taking advantage of the City of Boulder Rideshare subsidy.
View this offer and more...

55%
15%
14%
38%
13%
22%
11%
21%
7%
4%

FROM FIG. 6A

Company

My Score 701 | Commuting Routes (3) 702 | My Services 703 | My Offers 704 | Preferences 705 | 710 | Brody ▼

Your Commuter Score is within the average!

52 Average
0 — 100
↑ 5 pts this year
How is my score calculated?

715

716

$342 per month
Equivalent to 12 hours of work per month!
☹ 18% more expensive

32 min per commute
You spend 11.5 days a year commuting!
☺ 10% less time

135 lbs of carbon per month
Equivalent to 83 gallons of gas per year
☹ 22% more carbon Compared to other people in your area

Suggestions for your commute
Suggestions are personalized based on your commute preferences.

Maintenance in you Parking Lot ✕
Maintenance will happen during the 2nd week of June in your parking lot.
Shuttles are provided for the duration.

717

We've identified new routes that could save you $543 a year ✕
We've found new routes based on your commuting preferences 718 — Shuttle using shuttle service — Shuttle Service  View Route

DATA GATHERING, ANALYSIS, SCORING, AND RECOMMENDATION SYSTEM FOR COMMUTING

CROSS REFERENCE TO RELATED APPLICATIONS

The present application is a continuation of U.S. patent application Ser. No. 16/295,606 filed Mar. 7, 2019 and entitled "DATA GATHERING, ANALYSIS, SCORING, AND RECOMMENDATION SYSTEM FOR COMMUTING", which claims priority to U.S. Provisional Application No. 62/639,868, entitled "DATA GATHERING, ANALYSIS, SCORING, AND RECOMMENDATION SYSTEM FOR COMMUTING" filed Mar. 7, 2018, which is incorporated herein by reference.

FIELD OF THE DISCLOSURE

The present disclosure relates generally to applying a universal score to any entity involving commuters. In particular, but not by way of limitation, the present disclosure relates to systems, methods and apparatuses for applying scores via data gathering and analysis for systems involving individual commuters, enterprises, buildings, organizations, campuses, cities and regions.

BACKGROUND

Organizations of nearly any type and size, and the individuals who make up these organizations, are affected by commutes to and from their organizations. Cities and companies in particular are impacted by commuting considerations such as ease of access, parking, traffic, all of which affect their citizens, customers, employees, and others who interact with them. Individuals who commute to their workplaces are similarly affected by commuting considerations such as time, convenience, and cost. Further, these organizations and individuals are increasingly becoming conscious of their environmental impact—namely, carbon emissions—and many are attempting to reduce that impact in part by changing their commuting patterns, when possible.

However, there are often many barriers to changing commuter habits to those that are more beneficial to both organizations and individuals. These barriers include lack of knowledge of what habits would be better for individuals and their organizations, and lack of data about what improvements are feasible given local realities. Further, these barriers also include behavioral psychology-based reasons why individuals resist change. Therefore, a need exists for tangible solutions to help improve individual and organizational commuting habits.

SUMMARY

An aspect of the present disclosure provides a method for improving one or more commutes. The method may comprise gathering data about one or more metrics of at least one user's commute. The method may further comprise analyzing one or more alternate types of commutes available to the at least one user, generating, based on the data about one or more metrics and the analysis of the one or more alternate types of commutes available, one or more recommendations to the at least one user comprising at least one of the one or more alternate types of commutes.

Another aspect of the disclosure provides a platform for improving one or more commutes. The platform may comprise a database configured to receive data about one or more metrics of at least one user's commute. The platform may further comprise an analytics component configured to analyze one or more alternate types of commutes available to the at least one user and generate, based on the data about one or more metrics and the analysis of the one or more alternate types of commutes available, one or more recommendations to the at least one user comprising at least one of the one or more alternate types of commutes.

Yet another aspect of the disclosure provides a non-transitory, computer readable storage medium, encoded with processor readable instructions to perform a method for improving one or more commutes. The method may comprise gathering data about one or more metrics of at least one user's commute. The method may further comprise analyzing one or more alternate types of commutes available to the at least one user, generating, based on the data about one or more metrics and the analysis of the one or more alternate types of commutes available, one or more recommendations to the at least one user comprising at least one of the one or more alternate types of commutes.

BRIEF DESCRIPTION OF THE DRAWINGS

FIG. 5E is another portion of the graphical user interface shown in 5A-5D showing an organizational analytics dashboard according to the present disclosure;

FIG. 6B is another portion of a graphical user interface shown in FIG. 6A showing an optimization dashboard according to the present disclosure;

FIG. 7A is graphical user interface showing a first portion of an individual commuter dashboard according to the present disclosure;

FIG. 7B is graphical user interface showing a second portion of an individual commuter dashboard according to the present disclosure;

FIG. 9 graphical user interface showing an offers page for an individual user according to the present disclosure;

DETAILED DESCRIPTION

Figure 1:
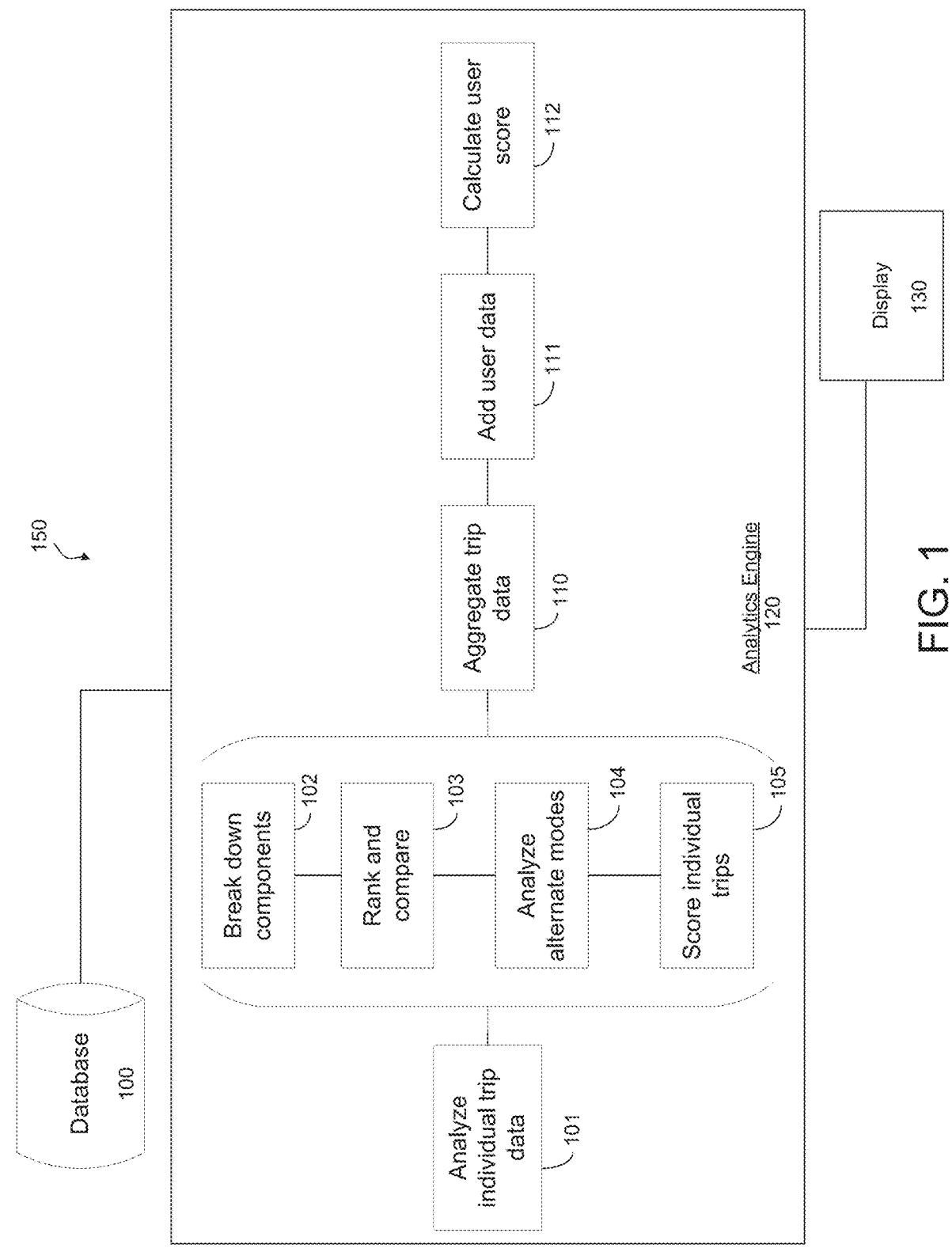
FIG. 1 is a logical block diagram showing a platform for improving commutes, including an analytics engine for calculating a commute score of a user according to the present disclosure.

The word "exemplary" is used herein to mean "serving as an example, instance, or illustration." Any embodiment described herein as "exemplary" is not necessarily to be construed as preferred or advantageous over other embodiments.

The technology of the present disclosure provides a method to apply a universal score to any entity involving commuters. "Entities" include, but are not limited to, commuters, enterprises, buildings, organizations, campuses, cities and regions.

An aspect of the system may be implemented by first collecting commuting data from various data sources, normalizing this data and then processing it. Using this data, the system is then able to calculate a score, understand commute patterns and provide recommendations on how to improve the score and measure its evolution. Throughout the disclosure, the term "commute" may be used to refer to a way an individual travels from a beginning location to a particular destination. Commutes may include a wide array of transportation methods and modes, over various periods of time, to and from various types of locations. The term "commuter" may be used interchangeably with the term "user."

The score is intended to be a universally useful measure, providing a clear and comparable concept of how any one person ranks on their commute, measuring across various modes (e.g., rideshare, bikeshare, driving, carpooling, bus, train, shuttle, ferry, car-share, scooter, walking, biking, etc.). Various metrics may be used to calculate the score, and may include, among other data, data gathered through transportation providers (e.g., Uber®, Lyft®, Limebike®, Car2Go®, public transit services, etc.) and motion tracking platforms (e.g., Fitbit®, Apple®, Garmin®, etc.). Other metrics may include measured or reported human behaviors, activities, or habits, as will be described in further detail throughout the disclosure.

The term "score," as referred to throughout the disclosure, may encompass several concepts. The term "User Score" may be used to refer to a score assigned to a particular individual for one commuting trip or an aggregation of a plurality of commuting trips. The term "Trip Score" may be used to refer to one particular route and/or mode of transportation used by one person at one time (an "individual trip"), and may also be used to refer to score given to an aggregation of a plurality of individual trips and/or a plurality of people taking those individual trips. An individual user or individual trip score may both be referred to as "Individual Scores." The terms "Commute Score" or "Commuter Score" may be used as blanket terms to refer to a score given to an aggregation of a plurality of user or trip scores grouped by one or more of any of the categories described herein. One particular type of Commute Score applied to an aggregation of scores from a particular organization may be referred to as an "Organization Score." As previously described, because the scores provided via the systems and methods of the present disclosure are designed to be universal, it is contemplated that variations of the scores may encompass similar concepts as those defined as "user scores," "trip scores," and "commute (or commuter) scores."

FIG. 1 is a logical block diagram 150 showing components of a platform for improving commutes the present disclosure. The blocks should not be construed as a hardware diagram, but may be implemented in hardware, software, firmware, or any combination of the three. The platform may comprise one or more databases 100, an analytics engine 120, and a display component 130. The analytics engine 120 may be configured to implement one or more algorithms for calculating commuter scores based in part on data from the database 100. It may also create models for improving commuter scores, which will be described in more detail later in this disclosure. Various outputs of the analytics engine may be shown via a display component 130, which may comprise data visualizations and may be implemented through a graphical user interface.

As shown, the analytics component 120 may implement an algorithm for calculating a user score. In the algorithm, a first step 101 may comprise analyzing individual trip data. The individual trip data may comprise several components itself, so further steps of the algorithm may comprise breaking down the components at step 102, ranking and comparing them at step 103, analyzing alternate modes of transportation at step 104, and scoring individual trips at step 105. At step 102, breaking down the components may comprise breaking down the components of an individual trip. For example, a person may walk from the person's home to a bus station, take a bus, and then walk from a bus stop to the person's office. Each of those components may have different time, cost, and environmental impacts associated therewith.

At step 103, ranking and comparing the components may comprise ranking and comparing across the various domains of a commute. Throughout the disclosure, the terms "domains" or "metrics" may be used to refer to any measurable, identifiable, or quantifiable aspect of a commute. Such metrics may include geographical locations, such as starting points of commutes, ending destinations, and stops between them, each of which are identifiable (e.g., through addresses or geolocation services). Comparisons across domains may involve evaluating information that is dependent on any variable metric. In comparing across the time domain, a bus takes less time than walking. Across the cost domain, a bus trip costs more than walking. Across the environmental impact domain, a bus trip emits more greenhouse gases and uses fossil fuels. Other domains may be measured, such as health impact. Walking and biking, for example, provide health benefits that other transportation modes do not. At step 104, analyzing alternate modes of transportation may comprise taking all information available across each ranked and compared component, and all information available for all other possible transportation modes for a particular beginning and ending point, and determining the possible time, cost, and environmental impacts of each. For example, Then, the algorithm may comprise aggregating the trip data at step 110, augmenting it with individual user data at step 111, and then calculating a score for the individual user 112. The hardware and/or software systems methods used to implement these steps will be described in detail throughout the rest of this disclosure.

Figure 2:
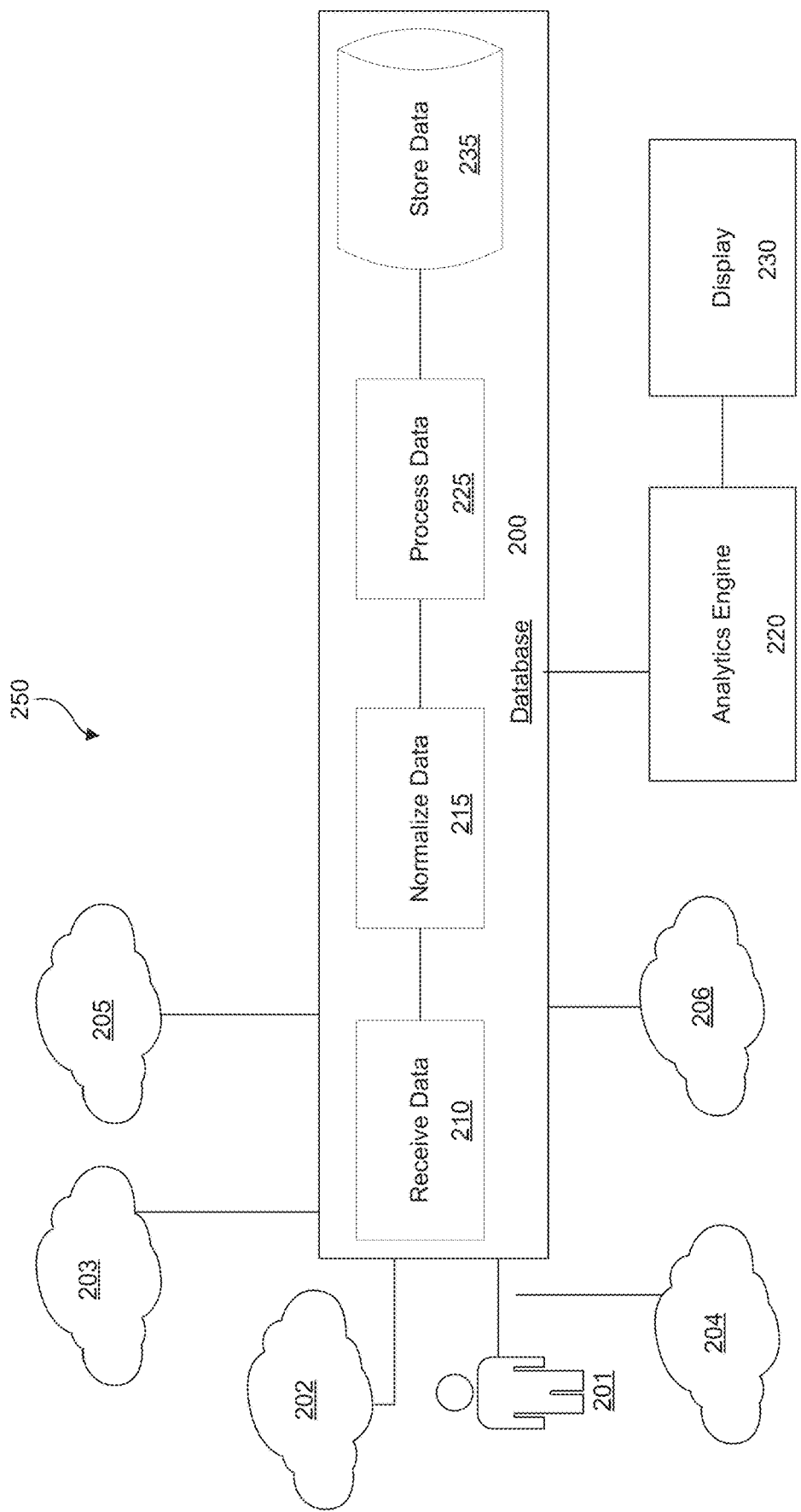
FIG. 2 is a logical block diagram showing a platform for improving commutes, including a database for collecting data to be used in calculating commute scores according to the present disclosure.

FIG. 2 shows a logical block diagram of a platform 250 that may implement aspects of the disclosure. The platform 250 may be the same as the platform 150 of FIG. 1, but shows aspects of the database component in more detail. The database component may receive data at an input location 210 in order to conduct an analysis of commuter habits. This data may come from various sources, including but not limited to commuter surveys and user input 201, external APIs 202, connected car data 203, GPS tracking devices 204, mobile applications 205, and any other additional data sources 206. In many embodiments, the data may be collected automatically in the background, without requiring constant user interaction. Some data collection input applications may require an initial user authorization, depending on the source. An aspect of the disclosure is that all data collected may be provider and mode-agnostic, meaning that it is not limited to a specific mode of commute, company, or proprietary platform.

The various types of data that may be collected will now be described in further detail. Self-reported data 201 may comprise various sources provided by the user, including commute surveys or manual commute logging. External APIs 202 may comprise APIs providing all kind of commute data, including services used by the user (ride-share, bike-share, car-share, shuttles, public transit, car, personal wearable devices such as fitness trackers, etc.) that make an API available. External API data may also comprise data from data warehouses and open data, which may be anonymized or non-anonymized. It is contemplated that anonymized data may be used for providing targeted recommendations and even product and service offers to users, and that such anonymized data can identify users by matching ID fields or other reference data if necessary. Targeted recommendations and offers will be discussed in more detail later in this disclosure. In embodiments, it is contemplated that commuter scores themselves may be calculated with anonymized data.

Connected Car data 203 may comprise GPS and trip data coming from connected cars, including both cars with connected capabilities, on-board diagnostic devices (OBD), GPS and other devices that can be plugged into a car. GPS Tracking data 204 may include any sort of device which involves GPS tracking that can provide insight over a user's commute. GPS data may be used to augment other collected data to properly identify routes and collect metrics. For example, GPS data from a user's personal device may be matched with driving routes or transit lines to measure actual time and stops associated with the route. Mobile App data 205 may include any means of tracking using a mobile app, including GPS, accelerometer, network signal, iBeacon®, location data, and more implemented in mobile devices. Additional Data Sources data 206 may include cell phone tower data, license plate recognition (LPR) data, parking gates, radio frequency identification (RFID), social media check-ins, and any other way to attach data.

Many applications that collect data, including those previously described, retain anonymized and non-anonymized historical data about users. Many services and companies conduct background tracking of applications, the data from which is accessible with proper permissions. It is contemplated that the data collection methods of the present disclosure may access historical data from such applications if and when it is available. One example of a user opt-in method of providing historical data to the platform is if a user connects their rideshare service account with the platform, the data from all the user's previous rides on that rideshare service may be input into the system and used to calculate the commute score. Historical tracking data from any background tracking application may be used for creating commuter score with a historical component, showing changes over time.

Embodiments of this historical tracking data may take many forms; many different apps use identifying information from personal mobile devices, such as phone numbers, IP addresses, device identification numbers (e.g., UUIDs), GPS and other information to track users' locations. In most cases, this tracking is done in a "background" fashion, with users often having little or no awareness that such tracking is taking place. To allay consumer concerns about this sort of tracking, this data is typically anonymized, meaning that although application providers can use this location information for various purposes, such as automatically serving location-based advertisements onto users' devices, the user's information (e.g., name, phone number, address) is typically not visible to anyone. However, in embodiments of the disclosure, a user may choose to opt-in and provide historical location data from such background tracking applications to the platform. This allows a user to provide extensive data records about where they have been in the past without manually entering information. This information may be used to create a commuter score.

Before the Process Data 225 component of the system may be implemented, it may first need to be normalized. The Normalizing Data component 215 may be implemented because data coming from different source often comes in different formats. Therefore, it may first be normalized into trips using algorithms, tables and statistics to convert it to a unified format the system can understand and group all relevant data together.

Then at the Process Data component 225, data may be processed in a way that provides more understanding of each trip and their associated metrics. These metrics may include a monetary cost, duration, carbon emission, locations (such as starting points and destinations) and other metrics. The Process Data component 225 may use third party API data to augment it with external datasets. External datasets may include, for example, traffic datasets to estimate the user's commute time, and databases of known miles per gallon (MPG) of vehicles to measure carbon output. They may also include public transit emissions reports, grid emission statistics, service provider APIs, General Transit Feed Specification (GTFS) data, and more.

A cost metric may be calculated for each trip using a mix of information provided with the data, data sources to estimate average cost for certain modes of transportations, and internal formulas. Cost information can come from external databases and/or third party service providers. For example, public transit passes may have a fixed cost posted on publicly available sites, which may be used as inputs to the system. Ride sharing services such as Uber® may provide exact costs of rides through an API. Other cost metrics may be based on estimations; for example, the estimated cost of driving a car may include estimates and calculations of car payments, insurance costs, and fuel cost.

A duration metric may be calculated for each trip using a mix of information provided with the data and route/traffic estimations provided from external sources. These external sources may include publicly available databases of historical information, or precise data given by third parties (e.g., the ride-sharing services previously mentioned) that tracks actual start and end times of trips. Any of this duration information may be received by the system via API or any other input method.

A carbon emission metric may be calculated for each trip using a mix of information provided with the data, data sources to estimate or measure carbon emissions of different modes of transportation and vehicles, and formulas.

Various additional metrics may also be processed specific to each mode of transportation to provide a complete, multi-dimensional information profile of each trip.

A key aspect of the present disclosure is the "commute score" (or simply, "score") calculation process and provision to a user, which transforms the commuting data that is collected into a score that provides the benefits of being actionable, comparable and understandable. The score itself allows for individual commuters and organizations to make improvements to their commutes. The commute score is something that is dynamic and can evolve both in real-time and retroactively as new commuting data is available.

Reference is now made back to FIG. 1 to more fully describe how the data that is gathered, normalized, and processed via the system of FIG. 2 is used to calculate a commute score. At step 101 of the algorithm, which analyzes individual trip data, each trip is first analyzed on an individual basis to provide understanding of commutes on a per-trip basis and consider individual components in the scoring mechanism. At step 102, each component is broken down to be analyzed both within a group and on its own. These include cost, location, and time and carbon efficiency as core components, but may also include additional factors, such as efficiency in reducing traffic and moving groups of people, general happiness of a particular user as a result of using a particular commute, and use of time while commuting.

The system of the present disclosure further accounts for additional human behavior-focused factors which impact individual commuters' likelihood of adopting recommended changes to their commutes. These factors include measurements and estimations of stress, health impact, vitality, predictability, weather impact, propensity to make stops (e.g., to drop off kids or get coffee), safety (e.g., bike collisions), usage of space (e.g., parking space taking space in a city), happiness, and sociability. These human behavior-focused factors help assess the real potential for improvement of particular commute scores based on behavioral economics principles. That is, humans commuting do not always simply choose the most "rational" commuting options in terms of time and money, but weigh many other factors. A person may know that carpooling is cheaper and better for the environment, but that person may not be sociable, and may therefore never choose carpooling, an activity which requires social interaction at the beginning and end of each workday, as an option. For others, walking or biking to work may be an option, but if they are unsure if there will be inclement weather that may impact their walk or bike commute home, and therefore they take individual car trips instead. Many people simply prefer their existing habits so much that merely presenting them with information that they could save time and/or money is not enough to get them to change a behavior. For many people for which the possibility of saving time, money, or making an improvement in some other domain is not quite appealing enough to make a change, a reward, subsidy, discount, or group goal may make a difference and get them to actually change. The commuter score of the present disclosure may be used to effectively implement such incentives and measure their impact.

At step 103, components may be compared against constants (some of which may be internal to the system), tables, and associated data to rank them relative to these data points. Associated data may include data from similar modes of transportation in the same region, global average data, data from similar commute, and more. This comparison allows the system to score each component. Tables and constants are used to rank against static measurement, such as optimal carbon emission of a vehicle trip. Associated data are used to rank against dynamic measurement and normalize the scoring across every region and mode of transportation.

At step 104, the system also measures alternate transportation options that matches the user's commute, to take into consideration available options when applying a score. By basing measurements on alternate transportation options, a user living in an isolated area with no other option than to drive is less penalized (e.g., given a higher score indicating less efficiency or other favorable attributes) than a user driving in a downtown area with various alternate modes available. By grouping all these calculations together, a score can then be calculated for the trip at step 105. This can be done by analyzing routes against all possible routes and modes of transportation based on each metric to understand relative efficiency. For example, a person who chooses to drive for one hour in traffic if a train exists that could bring that person to work in 40 min is relatively worse, according to the scoring system, than the same person driving for one hour if the only other option is public transit that takes two hours. Because there are so many different factors to calculate, each organizational entity (office building, school, city, etc.) has numerous considerations that affect the commute scores of the entity and the individuals who commute to it. Many such considerations are outside the control of the organization, the most significant of which is often the availability of alternative commuting options. Other organization considerations may be related to infrastructure within and around an organization, such as showers, bike racks, lockers, and parking structures. Yet others may have to do with logistics, such as required work hours and the necessity for employees to work on-site.

Calculating the user score can be done by aggregating all of a user's individual trip data for a certain period of time at the aggregate trip data component 110 and then analyzing it in view of other user data. User data component 111 may analyze information that is directly related to a user's commute, but which may not be attributed to an individual trip. This includes ownership of a vehicle, a monthly transit pass, parking space and many more conditions. This can also include core activities that are considered variables or obstacles that affect one's commute, such as having to drop off kids at school in the morning, a preference for stopping to get coffee, a physical or mental disability that limits available modes of transportation, or a temporary consideration such as a broken leg, pregnancy, illness, or a specific plan such as burning calories. User data may then be used to weight the aggregated trip score accordingly, and come to a finalized user score at step 112.

The purpose of collecting such intricate user data is because the commute scores are most beneficial when they take into the account not only quantifiable metrics of mechanical choices, but daily human needs of real people. People have goals, values, preferences, personalities, and other things that make them unique. Taking into account who each commuter is as a person helps all users of the system, including commuters and decision-makers for entities, better evaluate the best commutes for each person. User personalities and personal needs greatly affect possible commute options; someone who doesn't like crowds wouldn't likely choose to take a bus or a train. Someone whose job function requires maximization of time available in a workday would likely not choose any option that increases commute time, even if it is less expensive. Someone who has to drop off and pick up children would likely not take a bike to work even if they lived close by. Economic and demographic factors can also affect scores. For example, commuters who live in poorer or less safe areas may not choose to ride bikes even if it is the most inexpensive option because of safety concerns or the likelihood of a bike getting stolen. Although highly accurate scores which provide detailed insight into commutes may be created through the use of more and more data, basic commuter scores may be created with minimal information, such as a starting location, a destination, and a mode. These basic scores still provide important insight and allow for the improvement of commutes.

The commute scores calculated via the systems and methods of the present disclosure are not only useful to measure an individual user's commute, but also the commutes of any enterprise, building, organization, campus, city, business district or region, or any other entity that involves commuters. Calculation of any such group scores can be made by doing an aggregate of all user and trip scores relevant to the group in question, and weighting them based on any group specific data that needs to be taken into consideration. A group score may be applied to sub-sections of any organization to understand data among certain groups of commuters. Grouping may be based on office locations, departments, types of job, commute modes, starting geographical locations, or any personal user data used to calculate user scores.

The commuter score has many usages. Some such usages are described herein, but nothing in this disclosure should be construed to be limited to these applications. The commute score can be used for anything where a way to measure transportation brings a benefit. As one example, it may be used to make decisions on implementing work-from-home or telecommuting programs. It may also be used to decide whether to relocate a particular employee. As another example, a commuter score for office buildings can be used to decide upon, or measure the impact of, a new office or a corporate move, by analyzing the commuter score of all employees at the current location and/or at the new location, to precisely determine how employees would be affected, who would be affected, and what solutions could help minimize any problems. Knowledge of overall commute scores for different potential building locations can facilitates decision about potential moves. Entity decision-makers can compare multiple potential office locations and choose one with the best positive impact on employees' commuter scores in order to minimize turnover and employee dissatisfaction.

Individuals considering living and working arrangements may also use commuter scores to make decisions that improve or maximize their quality of life. For example, if an individual accepts a job in a new city, that person can select potential living accommodations based on the possible commute scores between their future home and workplace. Proximity, by itself, may not be the best indicator for choosing where to live. By using the commute score, the person can see what commuting options may be most cost-effective, time-efficient, and fitting with their lifestyle. In embodiments, a user could sort potential properties by commute score. The commute score could help make decisions such as whether to spend more money on rent for a place where the commute saves a comparable amount as compared to a different location. Alternatively, employees could even explore new jobs options based on commuter score, finding jobs with a good commute.

As another example, the score can be used as a way to identify commuters, groups or regions with commute issues in order to administer resources, subsidies, and new programs accordingly. It can be used to serve as a global method of comparing transportation systems, to compare any enterprise, group or region against each other, while taking into consideration all differences. It can be used as a way to measure the efficiency of any transit system, or any new mobility program implemented. It can be used as a way to advertise, market or display an individual's or organization's effort towards improving mobility, both as a global score or by showing individual components, such as a commitment to sustainability.

Further, the score can be used to justify budget spending within enterprises, cities or other organizations by showing measurable impact of investing in a particular program. For example, a service provider can use the score to precisely measure the impact their service will have on a group of commuters. This could be in the form of a city persuading a company to purchase or subsidize public transit passes for its employees because it will save the company money on parking fees. The score could be used in the form of a new transportation mode service provider, such as a new scooter company, persuading a city to allow permits for its operation by showing that it can reduce traffic congestion. A shuttle company could show a need for shuttles in a certain region based on a group of employees with bad commuter scores and a lack of good transportation options nearby. Showing tangible improvements can work by scoring the current commutes of all commuters, scoring all alternate solutions, and scoring the proposed solution. Use of quantified metrics actually identifies how many commuters would improve their commute, and by how much (based on actual measurements). The score of the present disclosure can also help identify whether subsidies would be required to entice commuters to change their commute modes and predict the efficacy of those subsidies.

Several applications of the commuter score may be implemented by making the score available within or through third-party applications. The commuter score may be licensed and provided to third-party applications which may be enhanced by providing it to their users. For example, ride-sharing companies, real estate developers, municipalities, schools, or any other organization could use the commuter score to improve its own recommendations, route suggestions, or facilitate any other useful interactions with its users, customers, or constituents. The commuter score and/or associated data may be provided in any manner, including through licenses, raw data, subscriptions, and/or APIs.

Another aspect of the disclosure is that with enough data available in a region, scores can not only be calculated, but it can also be predicted ahead of collecting data. Using artificial intelligence and other algorithms, a score can be inferred based on multiple factors, such as geographical location, to estimate what a score would be like for a certain group of users. This has many uses, one of which is to measure the impact of new infrastructure, building, or program developments ahead of implementing them.

Yet another aspect of the disclosure is that by using a series of algorithms, artificial intelligence and the commute data and scoring, recommendations can be made automatically to help improve commutes for users or groups. Recommendations may be made by looking at the current user's score in comparison with all other modes of transportation available to take his commute. Recommendations of the present disclosure take into consideration the user's preference and commute patterns, to offer alternate modes of transportation that are enjoyable and more efficient according to provided user data, including the aforementioned user personality traits, preferences, and lifestyle considerations.

Recommendations can be influenced by various factors to optimize certain components for a group. For example, an enterprise wanting to improve their sustainability score component might subsidize greener but more expensive means of transportation that achieve this result, increasing the sustainability portion of the score while lowering other components. The impact of these recommendations can be measured by following the evolution of the user's score as the user implements them, helping adjust future recommendations at the same time.

It is contemplated that an individual manager or department of an organization may be responsible for implementing commuting improvement programs. The recommendations and programs discussed herein may be directed at those managers or departments. Various methods may be implemented to increase the success of the recommendations and programs described. One benefit of having commuter scores be numerical and displayed on a visual icon is that it can be used for gamification purposes; that is, it can be used to create or feed into existing rewards systems based on behavior changes, incentives, and contests. For example, some companies have existing reward and incentive systems designed to encourage employees to take many different kinds of positive action related to a workforce. Such systems may be related to improving employee performance or health, among other things. These existing programs and systems may integrate the commuter score of the present disclosure. Having a tangible score associated with contests may increase the likelihood of people wanting to compete and make changes. Some examples of incentives are that a user could earn rideshare credits, vacation days or free lunch by choosing a sustainable commuting mode to work. Contests could be organized between departments, employees or companies to encourage biking or walking. The commuter scores—both the individual user scores and the organization scores—can help track and measure the impact of these programs.

Individual commuter scores can be beneficial in customizing and targeting recommendations to users who actually need them, rather than having general lists or recommendations that are not relevant to some users. For example, a new discount on shuttles could be broadcasted only to commuters who would see an improvement by using this new mode of transportation. Eligibility for programs can be determined based on individual users' commuter score. For example, a new subsidized ridesharing program could be made available only to users for whom the ridesharing option results in an increased commuter score compared to their existing routes.

Another feature of the system comprises alerts. These may be sent through the platform to individual users to let them know in advance if their commutes are going to be impacted. If weather, accidents, lot closures or construction, or transit service interruptions occurs on a users' known routes, the individualized data collected may be used to send alerts only to users who would be affected.

The disclosure therefore describes several beneficial systems and methods related to commute scores. FIG. 1 shows a platform and associated method for calculating an individual user score. The method may comprise analyzing individual trip data, aggregating trip data, adding user data, and calculating, via one or more algorithms, a user score. FIG. 2 shows the platform and associated method for managing data used to calculate one or more commute scores. The method may comprise collecting data from one or more users, one or more external APIs, one or more connected cars, one or more GPS tracking services, one or more mobile applications, and/or one or more additional data sources. The method may further comprise normalizing the data, processing the data, and storing the data.

Figure 3:
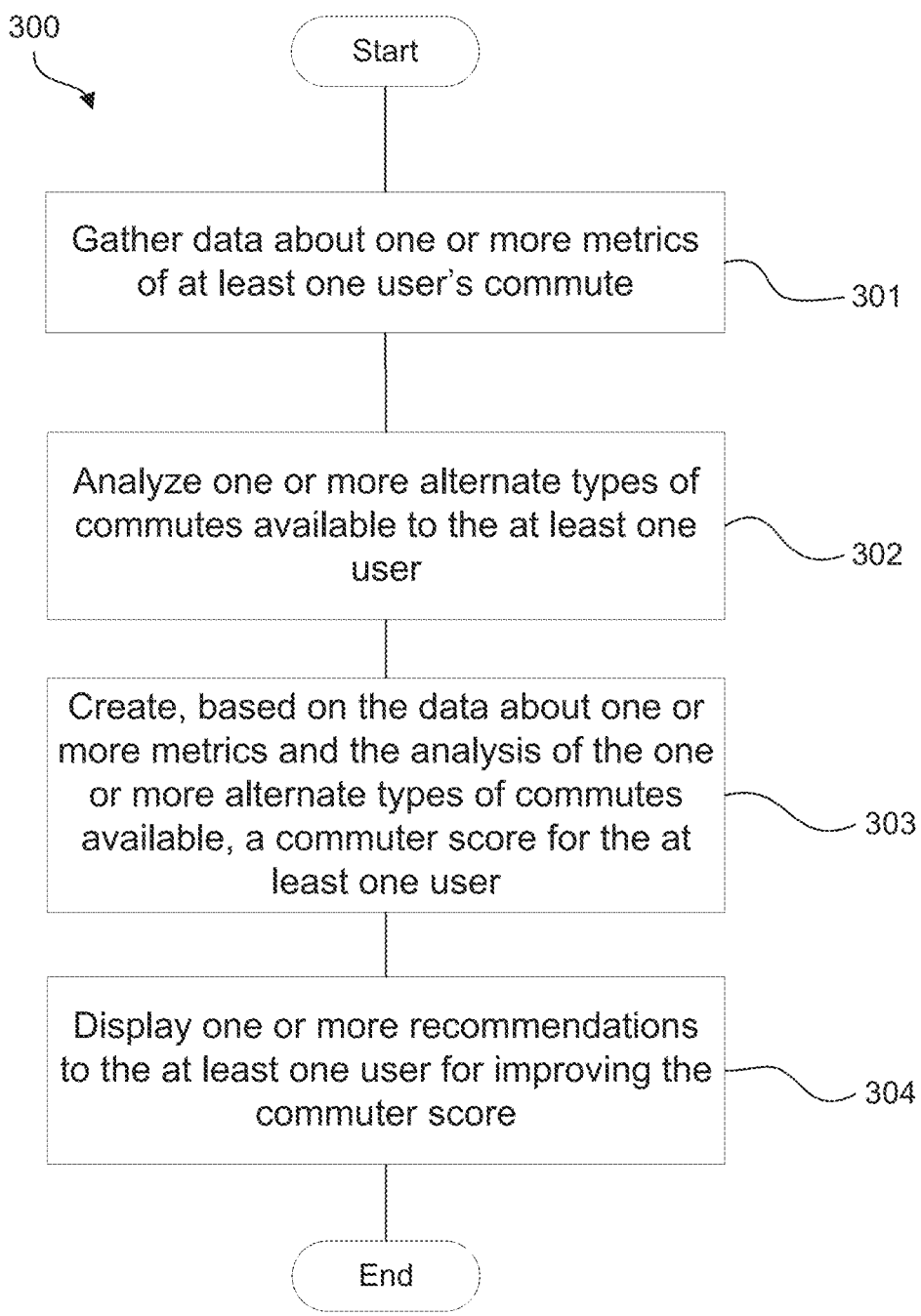
FIG. 3 is a flowchart showing a method for improving commutes according to the present disclosure.

FIG. 3 shows another method 300 of the present disclosure for creating and improving a commute score. The method 300 may comprise, at step 301, gathering data about one or more metrics of at least one user's commute. Then it may comprise, at step 302, analyzing one or more alternate types of commutes available to the at least one user. The method may further comprise, at step, 303, creating, based on the data about one or more metrics and the analysis of the one or more alternate types of commutes available, a commuter score for the at least one user. Then, the method may comprise, at step 304, displaying one or more recommendations to the at least one user for improving the commuter score.

Figure 4:
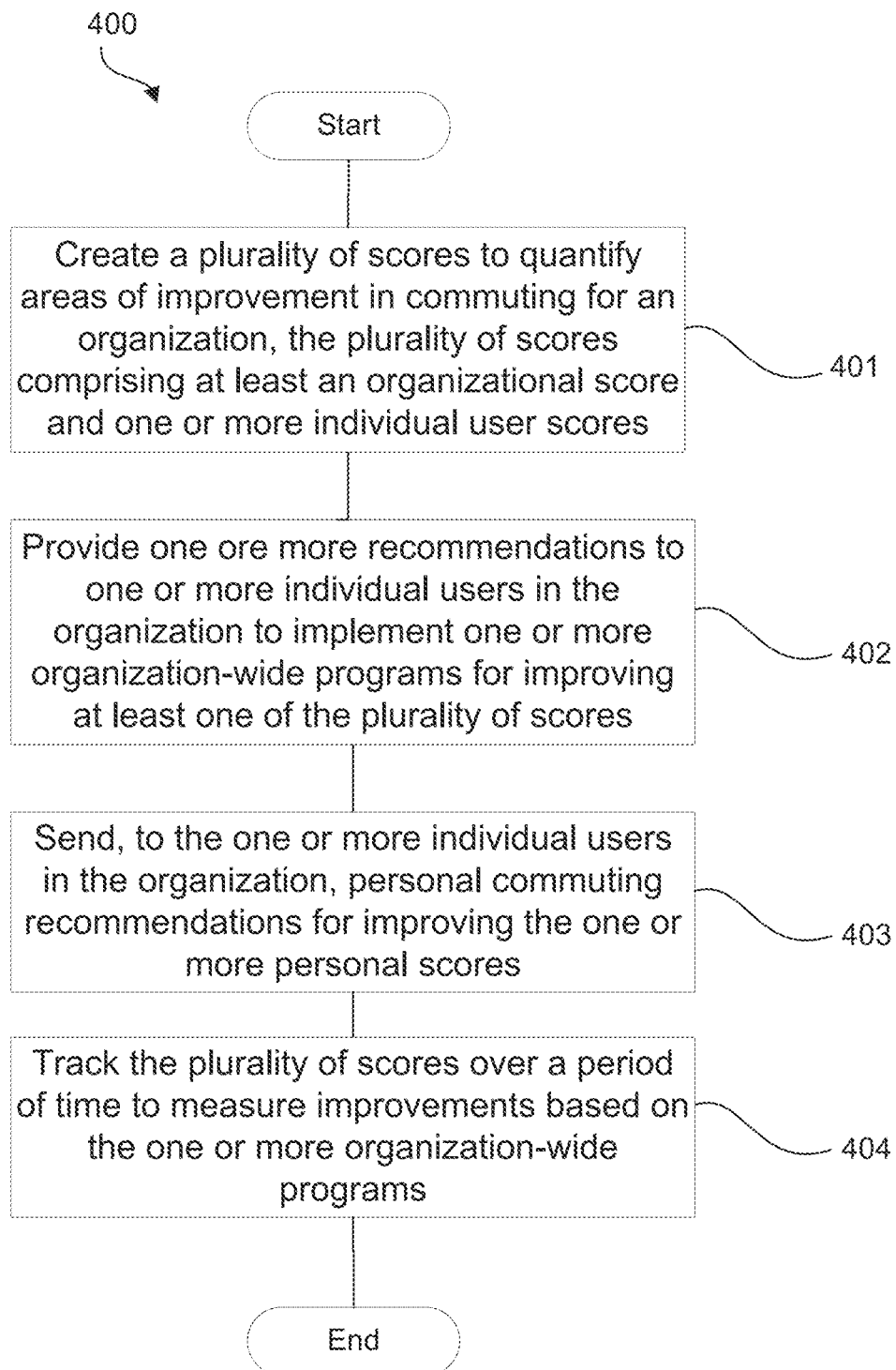
FIG. 4 is flowchart showing a method for improve commuting metrics of an organization according to the present disclosure.

FIG. 4 shows yet another method of the present disclosure for improving commutes across an organization. The method may comprise, at step 401, creating a plurality of scores to quantify areas of improvement in commuting for an organization, the plurality of scores comprising at least an organizational score and one or more individual scores. At step 402, the method may comprise providing one or more recommendations to one or more individual users in the organization to implement one or more organization-wide programs for improving the one or more scores. At step 403, the method may comprise sending, to the one or more individuals in the organization, personal commuting recommendations for improving the one or more personal scores. Then, at step 404, the method may comprise tracking the plurality of scores over a period of time to measure improvements based on the one or more organization-wide programs.

FIGS. 5A-9 show aspects of the disclosure as implemented through graphical user interfaces. The systems and methods described previously may be understood more clearly by reference to the following figures, and additional unique aspects of the disclosure are depicted through the display features themselves. Given the large quantities of data that are collected, analyzed, and used to create the commute scores, it is beneficial to users to be able to see quantified data and calculated scores in multiple ways on one or more easy-to-use data visualization and analytics dashboards.

Figure 5A:
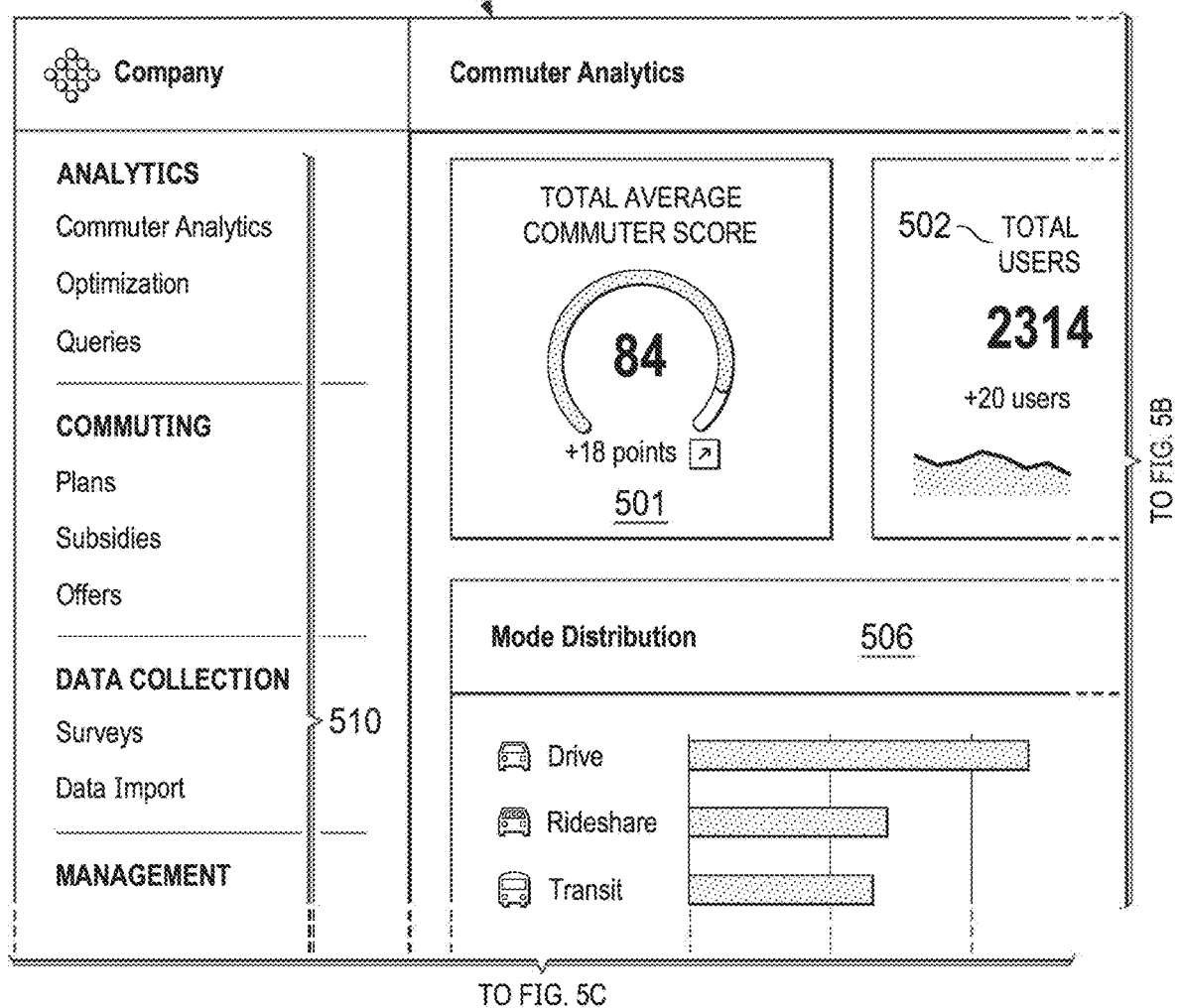
FIG. 5A is a portion of a graphical user interface showing an organizational analytics dashboard according to the present disclosure.
Figure 5B:
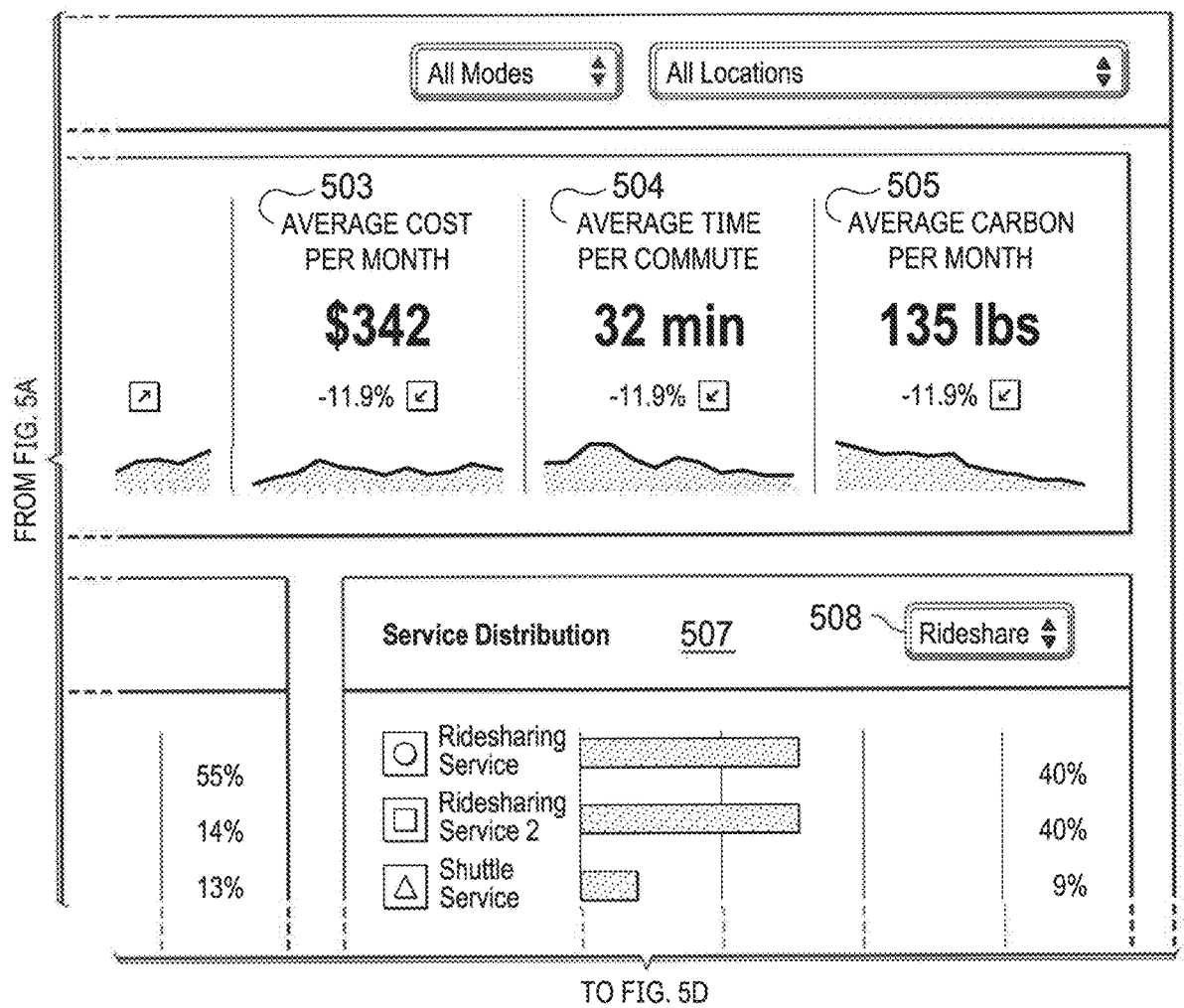
FIG. 5B is another portion of the graphical user interface shown in 5A showing an organizational analytics dashboard according to the present disclosure.

FIGS. 5A-5F show a commuter analytics dashboard 500, which provides a high-level view of multiple measured and calculated data points and metrics. Each of FIGS. 5A through 5F show different portions of the same graphical user interface and commuter analytics dashboard 500. In FIG. 5A, a menu 510 may be implemented to allow a user to navigate through various viewing options and displays. In embodiments of the present disclosure, the features and views described herein may be implemented in various orders and forms. A total average commuter score 501 is shown and represents an average for all users in the organization for which the dashboard 500 is being used. A commuter score, in embodiments, may be implemented on a scale of 0-100, with 100 being the top score. Other total and average values may be displayed, such as the total users 502, and in FIG. 5B, average cost per month 503, average time per commute 504, and average carbon per month 505.

Though not shown, another metric which may be displayed is the average cost per individual commute (i.e., per trip). Each may represent values that an organization may be interested in tracking and reducing or improving over time. Each of the displayed values may show a raw number, an indication of a recent trends up or down, and a historical display graph showing changes and/or progress over time.

In FIG. 5A, the dashboard 500 may also show a mode distribution graph 506, which displays what types of transportation modes are used by individual commuters in the organization. For example, percentages (or raw numbers) of commuters who drive, rideshare, take public transit, bike, and walk may be shown. For each mode, there may be, in FIG. 5B, a service distribution feature 507 for viewing a distribution of individual services or service providers. In the view shown, the service distribution 507 shows different rideshare providers, but a dropdown menu 508 may allow a user to select a different mode, such as public transportation, which may show percentages of users for a train and bus, for example.

Figure 5C:
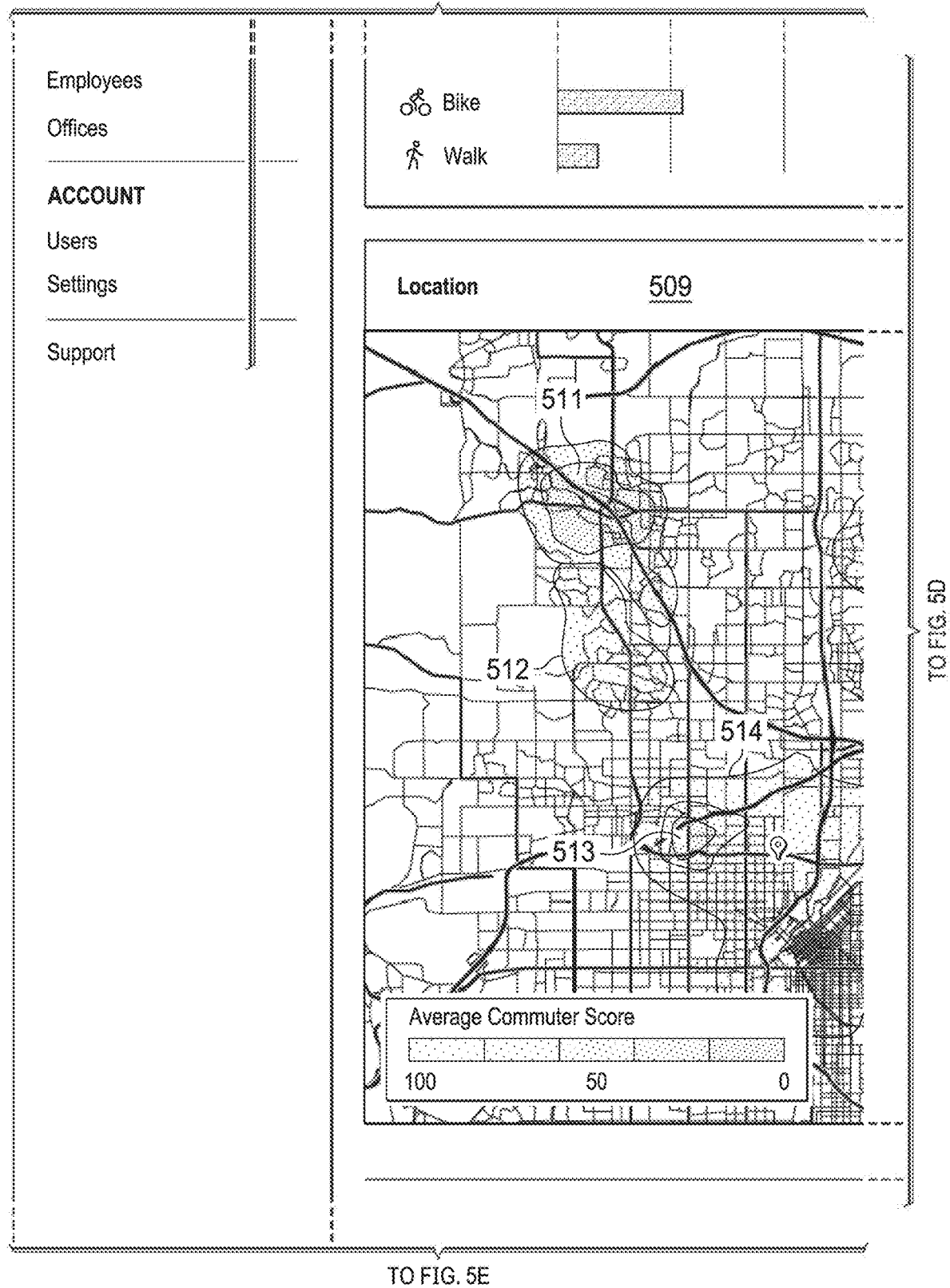
FIG. 5C is another portion of the graphical user interface shown in 5A and 5B showing an organizational analytics dashboard according to the present disclosure.

In FIG. 5C, the dashboard 500 may also comprise a geographical map 509 showing a heatmap-style distribution of average commuter scores across the organization in relation to the commuter's starting locations. As shown, average commuter scores may be depicted in different gradients or colors, making lower scores stand out. An advantage of this type of display format is that a manager can easily spot areas that are most ripe for improvement efforts. For example, in the heat map shown, low-score areas 511 and 513 are located within high-score areas 512 and 514, which indicate that a commuting manager within the entity should look further into why those low-score areas exist and focus efforts on improving those scores because the return on investment may be substantial.

Figure 5D:
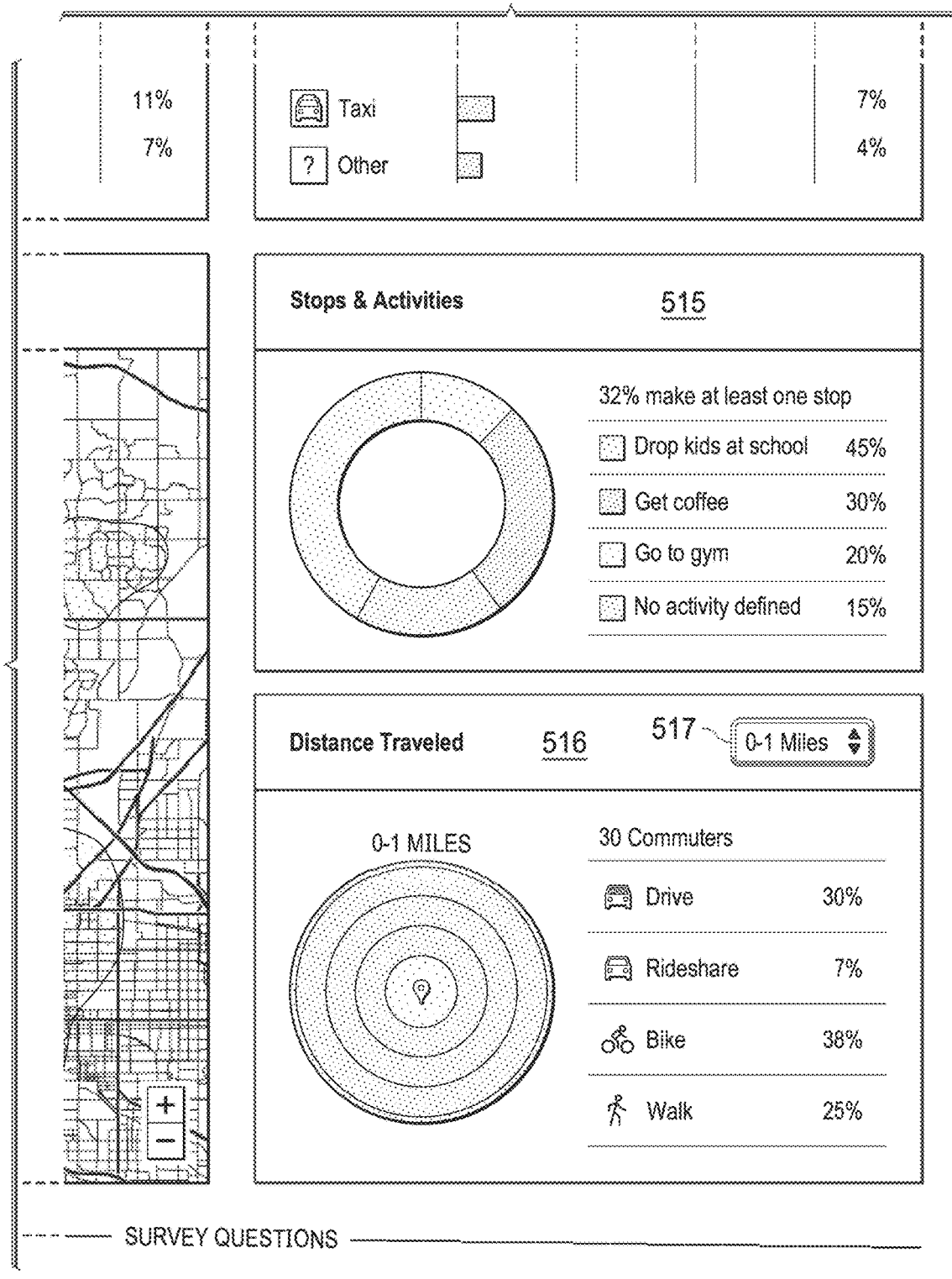
FIG. 5D is another portion of the graphical user interface shown in 5A-5C showing an organizational analytics dashboard according to the present disclosure.

In FIG. 5D, a "stops and activities" feature 515 may be used to show individual commuter habits that impact a commuter's score and ability to alter their commuting habits. As shown, these may include percentages of individual commuters who drop kids off at school, get coffee, go to the gym, or make other stops. This information may be input to the system by surveys of commuters or by GPS or car tracking data, as previously described in this disclosure. A "distance traveled" feature 516 may graphically display how many individuals commute by mode within different travel distances. In the example shown, the distance selected in the drop-down menu 517 is "0-1 miles," and 30% of the commuters who commute that distance drive their cars. This information can indicate to a commuting manager that some of those drivers could be successfully enticed to switch to higher-score commuting modes. Some may not, though, if they have a disability or have to drop off small children, which may be indicated through other features such as the stops and activities feature 515.

Figure 5F:
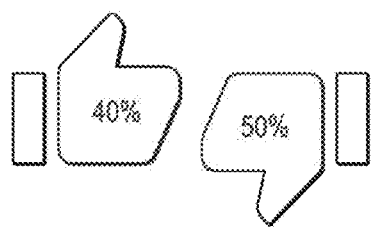
FIG. 5F is another portion of the graphical user interface shown in 5A-5E showing an organizational analytics dashboard according to the present disclosure.

Other survey-gathered information may be displayed on the dashboard 500. In FIG. 5E, survey information 518 shows responses to the question "what criteria do you care about in your commute?" In the example shown, 55% care about cost, which may indicate that a program reducing cost may be effective. Survey information 519 shows responses to the question "which of the following modes would you consider trying?" Reponses may include percentages that would consider biking, walking, ridesharing, or other modes. In FIG. 5F, survey information 520 shows responses to the question "do you take advantage of commuter benefits?" In embodiments, each of these survey questions may be implemented through a user interface that is part of the display and analytics system shown. The dashboard 500 may illustrate an interface as it looks in an organization that has already conducted surveys and which is implementing programs to improve its individual and overall organizational commute scores.

Figure 6A:
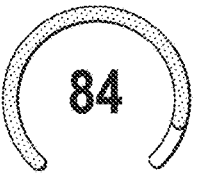
FIG. 6A is a portion of a graphical user interface showing an optimization dashboard according to the present disclosure.

FIG. 6A-6D shows an optimization dashboard 600, which may show actual metrics from the commuter analytic dashboard 500 of FIGS. 5A-5F, but in comparison to "goals" identified through modeling and analysis of possible alternate routes the individual commuters in the organization could have taken. That is, the commuter analytics dashboard 500 may show individual commuter scores calculated from a plurality of metrics and trips actually taken by the commuters in comparison to available alternate trips they could have taken. FIGS. 6A-6D each show different portions of the same optimization dashboard 600. In FIG. 6A, the optimization dashboard 600 may include a mode optimization display section 601, which shows maximum values and scores across domains if all users switched to their best possible commutes. As shown, an optimized commuter score may be 84, compared to a current one of 54. This optimized commuter score may not ever reach 100, which would represent an ideal, yet unrealistic scenario in which cost, time, and carbon emissions for all commutes were at or near zero (i.e., everyone who commutes lives within a short, easy, walking distance). The term "optimized," for the purposes of the present disclosure, may refer to a score or set of conditions that is ideal in view of several realistic constraints.

One or more algorithms may be used to create models of combinations of commuting factors that constitute "optimized" conditions. In embodiments, artificial intelligence, such as machine learning and deep learning programs may be used to create such models. In embodiments, inputs and thresholds from system users can be used to determine what factors should be weighted most heavily to calculate optimization levels. For example, some models may weight lowering cost as the most important factor for determining optimization; others may weight lowering carbon output as the most important.

In mode optimization display section 601, a current and optimized overall commuter score is shown, as well as optimization metrics across domains; current and optimized average cost, a current and optimized average time, and a current and optimized carbon output per commuter. These optimized metrics may correspond to the optimized mode distribution display 602, which shows for each commuting mode, what the organization's current distribution is and what the optimized distribution would be that would result in the optimization metrics across domains shown in display section 601. In the example shown, 55% of the organization's commuters drive, but it is only ideal (according to the model) for 15% of the organization's commuters to drive; everyone else could improve their individual commute scores by switching modes. Only 14% of commuters currently rideshare, but if that number could improve up to 38% of the organization's total, that would be ideal. In many organizations, these optimization models and visualizations may help commuting managers easily identify areas that are the biggest targets for improvement. As shown in this example, the differences between current and optimized drive percentages and current and optimized rideshare percentages are both large; the commuting manager may want to prioritize a program incentivizing ridesharing. Conversely, the difference between current and optimized walk scores is minimal, and it may not be a good use of the organization's resources to make changes around that mode.

Figure 6C:
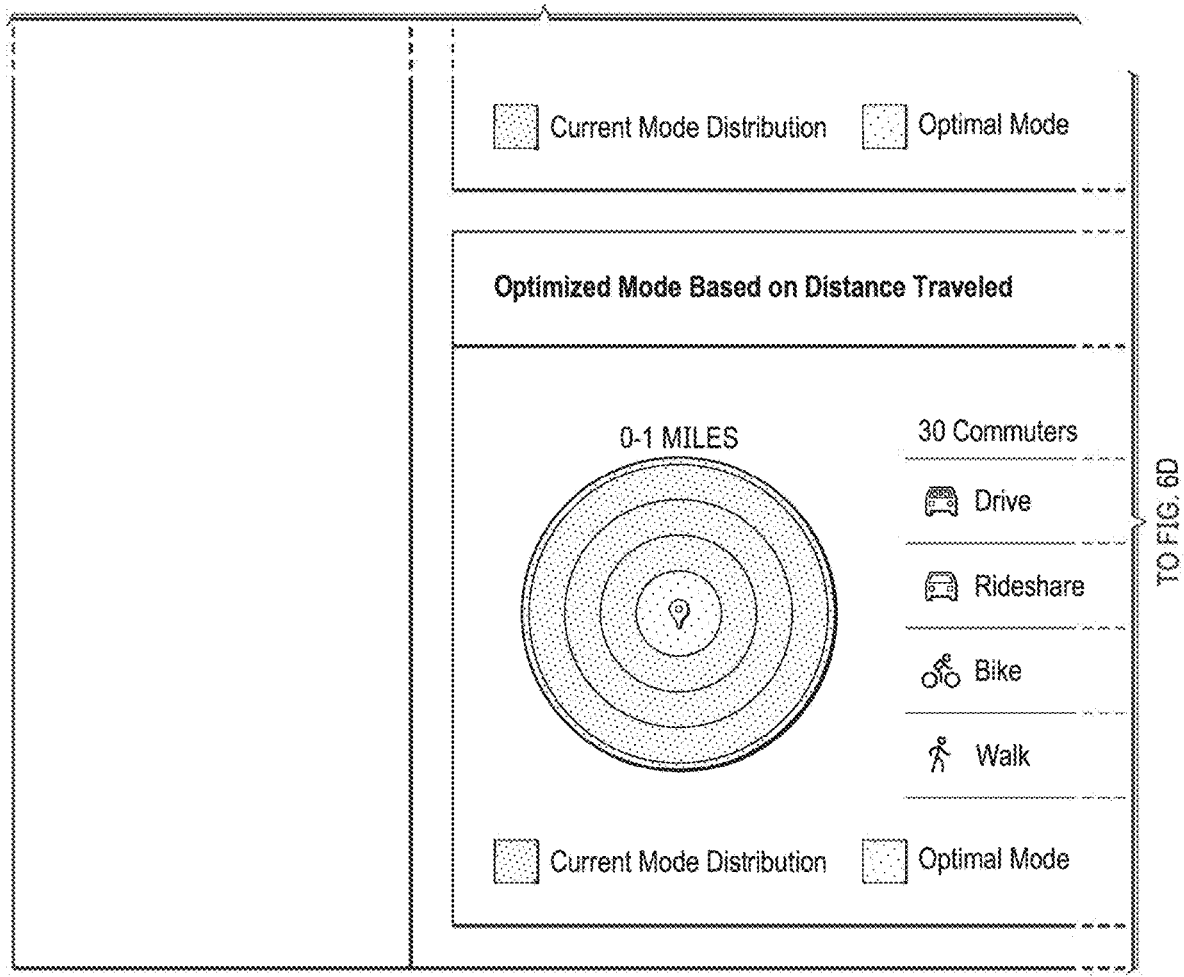
FIG. 6C is another portion of a graphical user interface shown in FIGS. 6A and 6B showing an optimization dashboard according to the present disclosure.
Figure 6D:
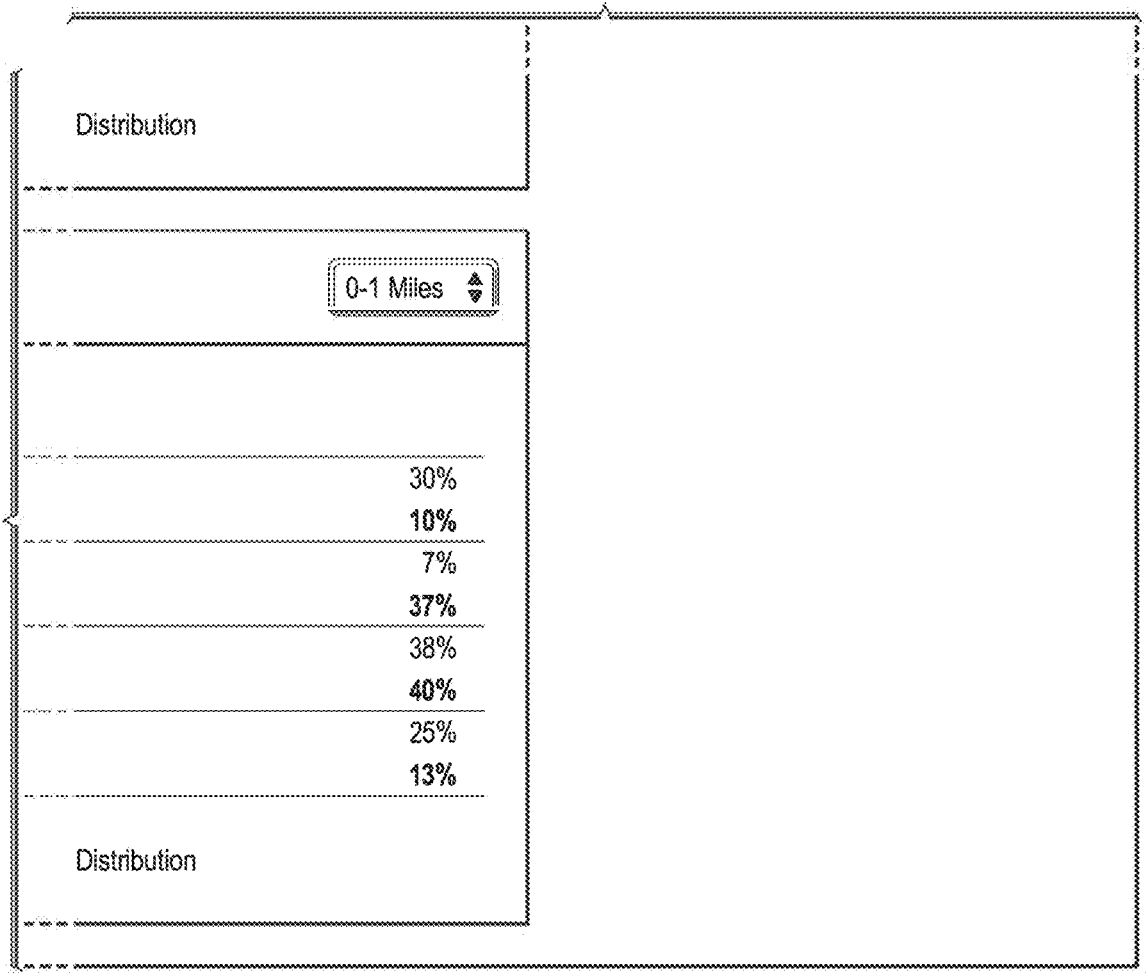
FIG. 6D is another portion of a graphical user interface shown in FIG. 6A-6C showing an optimization dashboard according to the present disclosure.

In FIG. 6B, the optimization dashboard 600 may also show a subsidy calculator 603. One of the most straightforward incentive programs an organization can implement to encourage commuters to change their commute habits is to offer monetary subsidies to offset costs or to make a low cost option even more attractive. Behavioral economics research shows that often, a slight reduction in cost is often not enough to overcome other barriers to changing an existing behavior, such as comfort, habit, and resistance to change. The subsidy calculator allows commuting managers to apply monetary values to potential subsidies and automatically calculates total costs for particular subsidies. The examples shown calculate an $80 subsidy (in this case, per month) for 150 users who choose to user a rideshare service and who live within 10 miles. The number of users and distance in miles may be automatically derived by the system, which already has such data stored. A commuting manager can change the dollar amount of the subsidies, add new subsidies, and examine the costs in order to weigh them against the benefits or savings in other areas. FIGS. 6C and 6D show additional information on the displays of optimized mode distribution 602. The optimization dashboard 600 may also include a "suggestions" feature 604, which displays information about local government or other programs that may provide external subsidies as part of their own commuting improvement programs. These suggestions may be input through one of the data gathering mechanisms previously discussed.

FIG. 7A shows a first portion of an individual user dashboard 700. In the example shown, the individual user dashboard 700 has a menu 710, which has tabs for different screens of the individual user dashboard. The menu 710 and the individual tabs may vary in content in different embodiments. As shown, the first page is a "my score" page 701. Also available are a "commuting routes" tab 702, a "my services" tab 703, a "my offers" tab 704, and a "preferences" tab 705. Each of these will be described in further detail.

The my score page 701 displays information relevant to a particular user within an organization. The individual user's commute score will have been calculated based on inputs collected automatically or provided by the user according to one or more of the methods previously described. The commute score 715 may be displayed prominently on a circular graph as a numerical value, and may have a color associated with it and/or visually depict it as a percentage of a possible larger score. It is contemplated that other visual cues or different graph formats may be used to convey the individual commuter score. An "alerts" section 717 may display information that may affect a user's commute. A "new route suggestion" section 718 may show a summary of personal recommendations for the user.

Figure 7B:
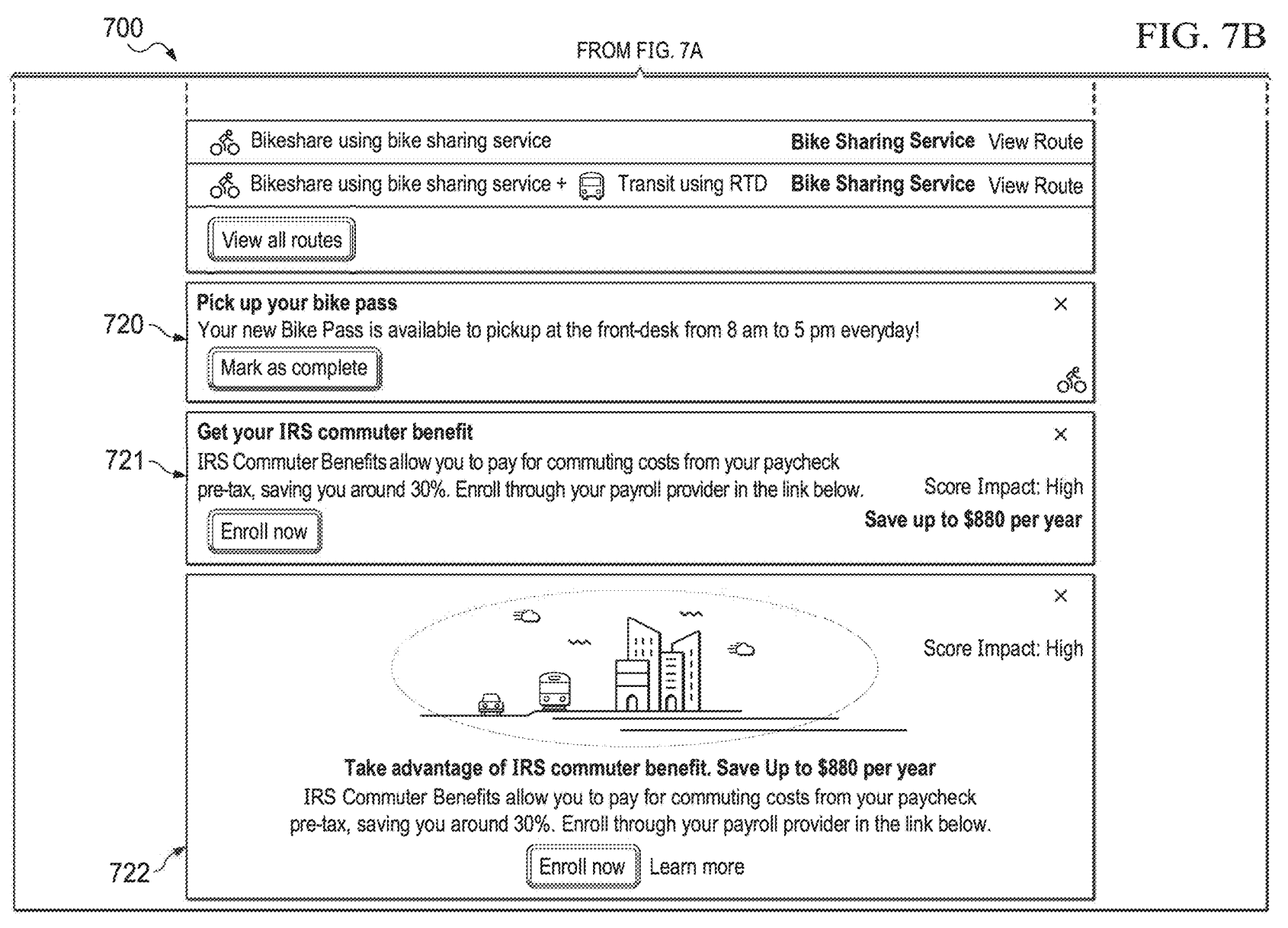

FIG. 7B shows a second portion of the individual user dashboard 700 of FIG. 7A. Shown are action items 720, 721, and 722. Each illustrate a possible action a user may take to improve the user's commute, and may reflect a benefit or service available through the user's organization (i.e., the user's workplace) or through a local, regional, state, or federal program. One such example is the action "pick up your bike pass," as shown in 720. This action item may simply show an action available for a user to undertake physically, but then record the completion of the action within the platform. For example, the user may physically pick up their bike pass, and the person distributing the bike passes may enter the user's information and bike pass ID and confirm that they picked up the bike pass within the platform. In embodiments, the bike pass (or other physical item) may be trackable with RFID or another type of trackable technology, and therefore may be used to measure and record data that may be used for generating the commuter score. For example, the bike ID or a parking lot badge may be scanned at a gate and provide data on when a user arrives at a location.

Another example is the one shown in 721 and 722 in different formats, which is the option to get an IRS commuter benefit. This action item provides a link within the platform to allow the user to enroll directly. Each of the action items may show how the action improves the user's commuter score and describe benefits, such as how much money the user can save. It is contemplated that multiple action item options may be presented to a user on the dashboard 700.

Figure 8:
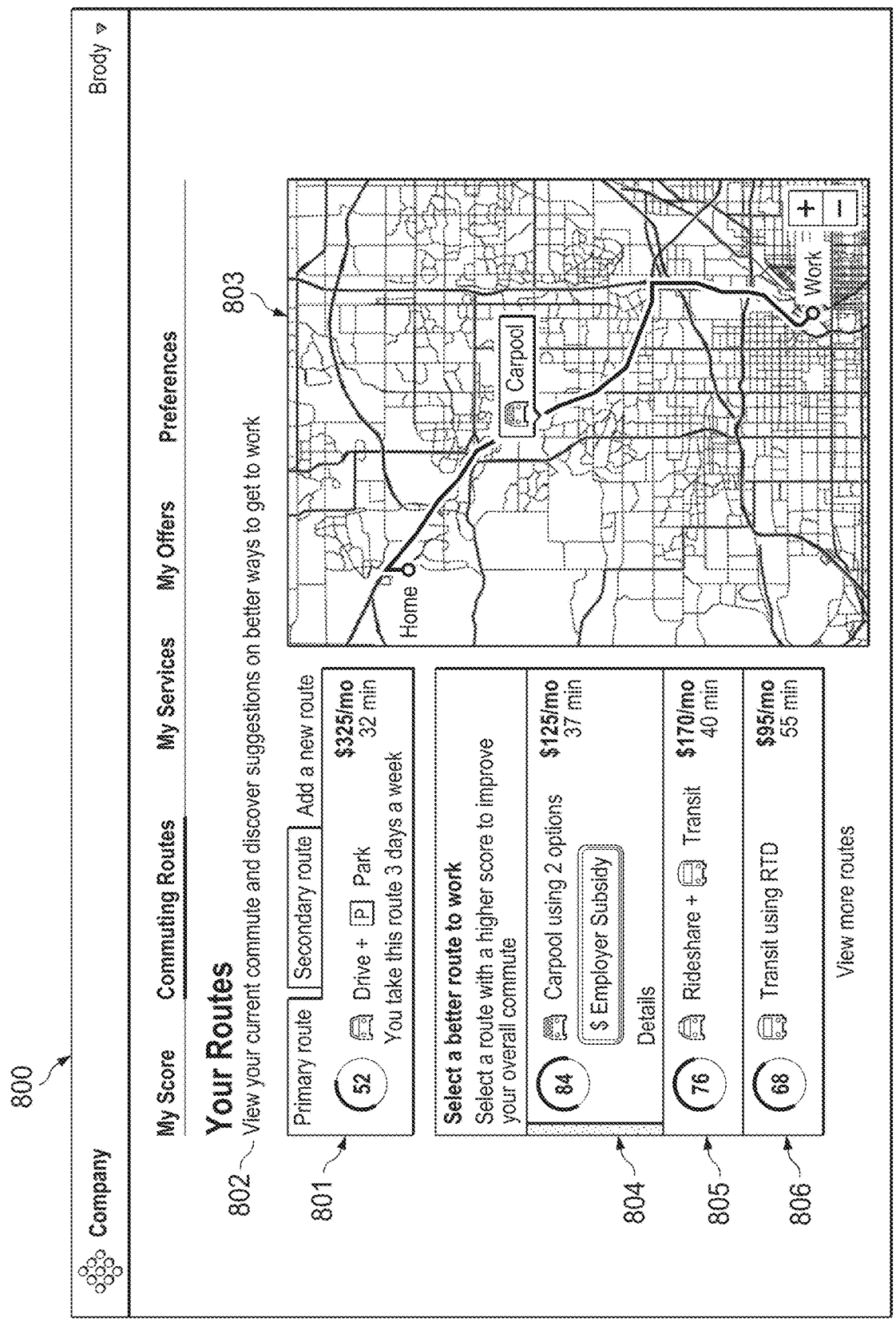
FIG. 8 is a graphical user interface showing a routes page for an individual user according to the present disclosure.

FIG. 8 shows a routes page 800 for an individual user. The routes page 800 shown comprises a menu 802 showing that multiple route displays are available to a commuter, such as a primary route display 801, a secondary route display 807 and "add a new route" option display 808, which are shown as tabs. A route map 803 may show the routes available on the menu 802 and other route options. The primary route display 801 shows a route the user takes to work most often, according to data gathered by the various methods described in this disclosure, such as geolocation services and user inputs. It shows information about the primary route, such as the modes of transportation and infrastructure (i.e., driving and parking) used, the monthly cost of the commute, the time it takes, how often the user takes this route, and the score. In embodiments, other information may be shown. The primary route may be displayed on the route map 803.

If a user takes a secondary route, the user can view the secondary route's statistics by clicking on tab 807. The user may also add a new route through tab 808, which may allow a user to select other modes of transportation to view time, cost, and other metrics of different commutes from the same location. It may also allow a user to select a different starting and ending location, or routes with multiple stops, to account for circumstances such as needing to commute to two different work locations, or to drop off kids at school. Each of the possible routes may be visually displayed on the route map 803, with visualizations of the associated commuter scores, modes, costs, times, and other metrics displayed. There may be as many route tabs displayed as there are routes historically used by the user, and these may be automatically generated through any of the data gathering methods of the present disclosure. A user may also manually enter as many routes as the user desires, and each will show up in a new tab.

Another feature of the routes page 800 is that it may display other alternative routes with higher scores. These may be displayed in a way that compares overall scores, modes, costs, times, and other metrics to allow a user to try or select options based on what is important to them. As shown, the first alternative route 804 has the highest overall commute score and an associated employer subsidy designed to encourage the user to select that option. A second alternative route 805 and third alternative route 806 are also shown, and though they have lower scores, they are higher than the user's current score shown in primary route 807. If the user doesn't want to carpool even though it is the best option in terms of a commuter score—if the user prefers not to socialize with co-workers, for example—but prefers to save money and read books on the way to work, the user might select the third alternative route 806.

Figure 9:
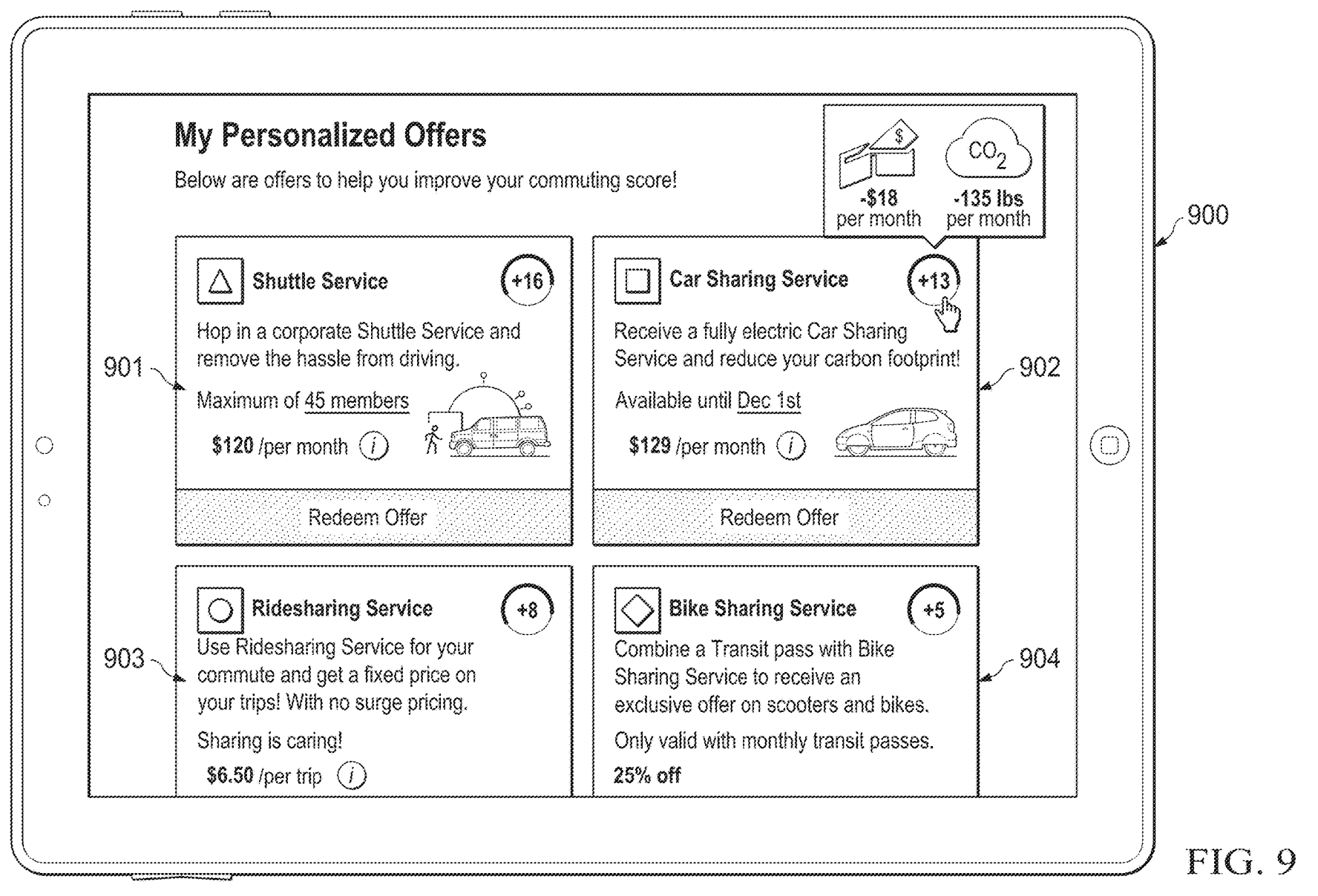

In addition to recommendations and subsidy programs, another aspect of the system provides offers. Commuter scores and user data can be used to target users with all sorts of offerings that can help improve the commuter score. FIG. 9 shows an offers dashboard 900. Offers can be proposed as simple recommendations or exposed as a marketplace, allowing employers, organizations and service providers to create and target consumers with offers that can improve the score. As shown, a shuttle service offer 901 shows a price, a description, an indicator showing the improvement in commuter score that is achievable if the user redeems the offer, and a link to take action on the offer. A car-sharing service offer 902, a ridesharing service offer 903, and a bike-sharing service offer 904 show similar features.

Offers can take many forms and be provided by many different kinds of vendors besides transportation-mode vendors. For example, a real-estate developer can offer housing deals near a work location to improve a user's commute. A rideshare provider can offer a fix discounted fee on rides to have a competitive price for a daily commute. An insurance provider can offer better pricing for driving based on commute habits. A car company could offer an affordable option to obtain a new electric car, reducing carbon impact.

Offers may not only be offered to individuals, but to organizations as well. Electric bike vendors could offer dedicated electric bikes to be purchased by a company for its employees, teleworking solutions vendors could offer companies services to save employees from commuting, and parking lot operators could offer a volume pricing on parking to organizations to reduce commute cost. Similarly, municipalities and organizations could offer dedicated subsidies, rewards or benefits through the offers feature.

Figure 10:
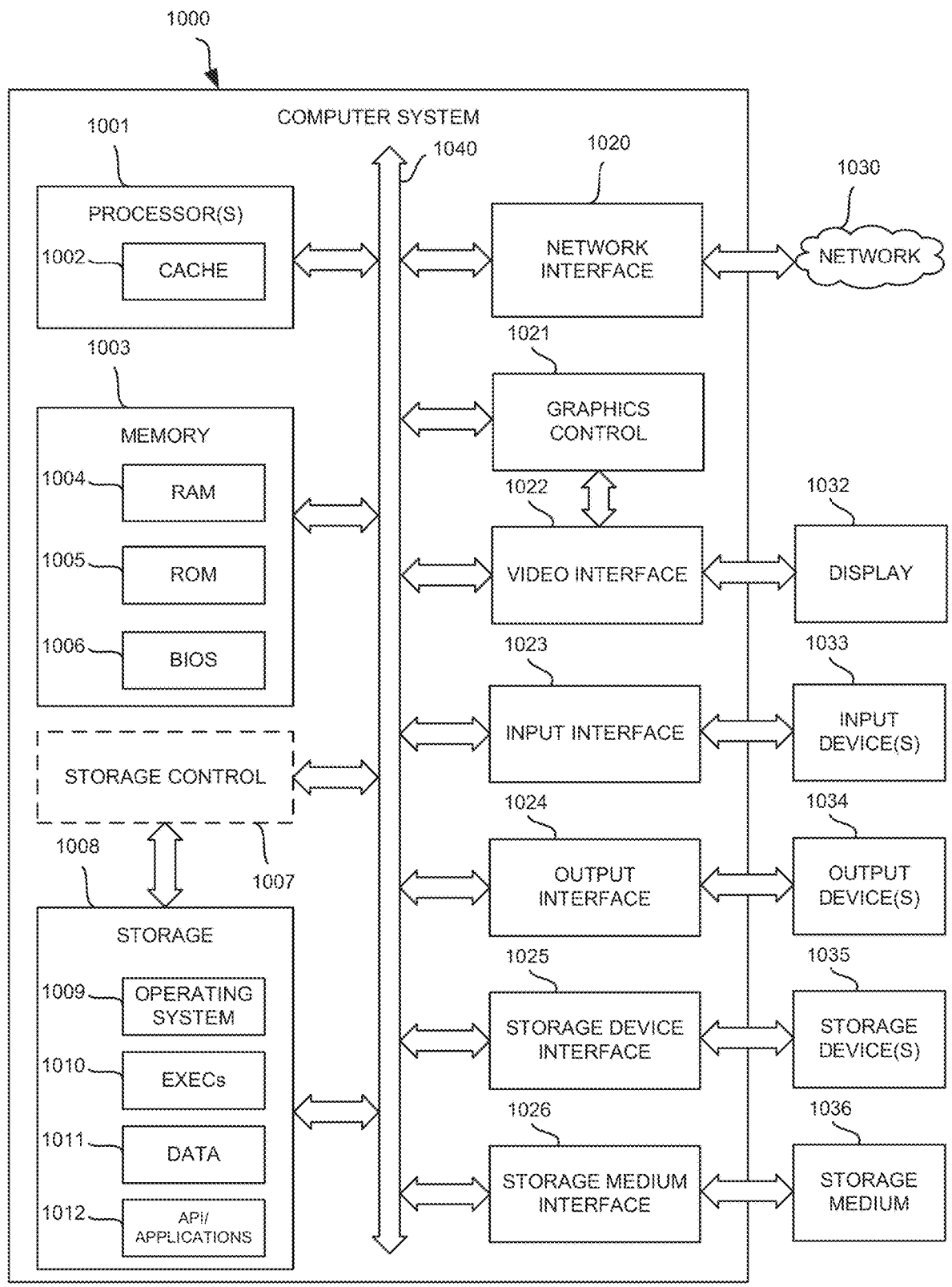
FIG. 10 is a logical block diagram depicting a computer that may be used to implement one or more aspects of the present disclosure.

Referring next to FIG. 10, it is a block diagram depicting an exemplary machine that includes a computer system 1000 within which a set of instructions can execute for causing a device to perform or execute any one or more of the aspects and/or methodologies scheduling of the present disclosure. The components in FIG. 10 are examples only and do not limit the scope of use or functionality of any hardware, software, embedded logic component, or a combination of two or more such components implementing particular embodiments.

Computer system 1000 may include a processor 1001, a memory 1003, and a storage 1008 that communicate with each other, and with other components, via a bus 1040. The bus 1040 may also link a display 1032, one or more input devices 1033 (which may, for example, include a keypad, a keyboard, a mouse, a stylus, etc.), one or more output devices 1034, one or more storage devices 1035, and various tangible storage media 1036. All of these elements may interface directly or via one or more interfaces or adaptors to the bus 1040. For instance, the various tangible storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1001 (or central processing unit(s) (CPU(s))) optionally contains a cache memory unit 1002 for temporary local storage of instructions, data, or computer addresses. Processor(s) 1001 are configured to assist in execution of computer readable instructions. Computer system 1000 may provide functionality for the components depicted in FIG. 1 as a result of the processor(s) 1001 executing non-transitory, processor-executable instructions embodied in one or more tangible computer-readable storage media, such as memory 1003, storage 1008, storage devices 1035, and/or storage medium 1036. The computer-readable media may store software that implements particular embodiments, and processor(s) 1001 may execute the software. Memory 1003 may read the software from one or more other computer-readable media (such as mass storage device(s) 1035, 1036) or from one or more other sources through a suitable interface, such as network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software.

The memory 1003 may include various components (e.g., machine readable media) including, but not limited to, a random access memory component (e.g., RAM 1004) (e.g., a static RAM "SRAM", a dynamic RAM "DRAM, etc.), a read-only component (e.g., ROM 1005), and any combinations thereof. ROM 1005 may act to communicate data and instructions unidirectionally to processor(s) 1001, and RAM 1004 may act to communicate data and instructions bidirectionally with processor(s) 1001. ROM 1005 and RAM 1004 may include any suitable tangible computer-readable media described below. In one example, a basic input/output system 1006 (BIOS), including basic routines that help to transfer information between elements within computer system 1000, such as during start-up, may be stored in the memory 1003.

Fixed storage 1008 is connected bidirectionally to processor(s) 1001, optionally through storage control unit 1007. Fixed storage 1008 provides additional data storage capacity and may also include any suitable tangible computer-readable media described herein. Storage 1008 may be used to store operating system 1009, EXECs 1010 (executables), data 1011, API applications 1012 (application programs), and the like. Often, although not always, storage 1008 is a secondary storage medium (such as a hard disk) that is slower than primary storage (e.g., memory 1003). Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. In one example, a user of computer system 1000 may enter commands and/or other information into computer system 1000 via input device(s) 1033. Examples of an input device(s) 1033 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, specifically mobile devices and enterprise systems, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) in the form of one or more packets in memory 1003 and communicated to network 1030 from network interface 1020. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1030, may employ a wired and/or a wireless mode of communication. In general, any network topology may be used.

Information and data can be displayed through a display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and fixed storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021.

In addition to a display 1032, computer system 1000 may include one or more other peripheral output devices 1034 including, but not limited to, an audio speaker, a printer, and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition, or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for ranking one or more commute options, the method comprising:
   receiving user commute information including at least a start location and an end location;
   analyzing a plurality of commute options available to the at least one user, wherein the analyzing the plurality of commute options available comprises analyzing a plurality of modes of transportation;
   generating, based on the data about the user commute information and the analysis of the plurality of commute options available, a plurality of recommendations to the at least one user comprising at least a portion of the plurality of commute options available; and
   ranking the plurality of recommendations based at least in part on two or more of an estimated duration, an estimated monetary cost, and estimated carbon emissions associated with each of the plurality of recommendations.

2. The method of claim 1, wherein the analyzing the plurality of commute options available further comprises analyzing
   one or more routes.

3. The method of claim 1, further comprising:
   creating a commuter score for each of the plurality of recommendations based on data about one or more metrics and the analysis of the plurality of commute options available, wherein the one or more metrics comprise one or more of the estimated duration, the estimated monetary cost, and the estimated carbon emissions, wherein the commuter score comprises a numerical value; and
   wherein
   ranking the plurality of recommendations is based at least in part on a respective commuter score for each of the plurality of recommendations.

4. The method of claim 1, wherein the plurality of recommendations comprise at least one recommendation for reducing each of:
   time spent commuting;
   money spent commuting; and
   carbon emissions resulting from commuting.

5. The method of claim 3, wherein the at least one user comprises a plurality of users, and wherein the plurality of users are associated with an organization, and further comprising:
   creating an organization commuter score comprising an aggregation of commuter scores for the plurality of users.

6. The method of claim 5, further comprising:
   displaying one or more models for improving the organization commuter score.

7. A platform for ranking one or more commute options, the platform comprising:
   a process data component configured to:
   receive user commute information including at least a start location and an end location;
   an analytics component configured to:
   analyze a plurality of commute options available to the at least one user, wherein the analyzing the plurality of commute options available comprises analyzing a plurality of modes of transportation;
   generate, based on the data about the user commute information and the analysis of the plurality of commute options available, a plurality of recommendations to the at least one user comprising at least a portion of the plurality of commute options available; and
   rank the plurality of recommendations based at least in part on two or more of an estimated duration, an estimated monetary cost, and estimate carbon emissions associated with each of the plurality of recommendations.

8. The platform of claim 7, wherein the analyzing the plurality of commute options available further comprises analyzing
   one or more routes.

9. The platform of claim 7,
   wherein the analytics component is further configured to create a commuter score for each of the plurality of recommendations based on data about one or more metrics and the analysis of the plurality of commute options available, wherein the one or more metrics comprise one or more of the estimated duration, the estimated monetary cost, and the estimated carbon emissions, and wherein the commuter score comprises a numerical value; and wherein
   ranking the plurality of recommendations is based at least in part on a respective commuter score for each of the plurality of recommendations.

10. The platform of claim 7, wherein the plurality of recommendations comprise at least one recommendation for reducing each of:
    time spent commuting;
    money spent commuting; and
    carbon emissions resulting from commuting.

11. The platform of claim 9, wherein the at least one user comprises a plurality of users, and wherein the plurality of users are associated with an organization, and wherein the analytics engine is further configured to:
    create an organization commuter score comprising an aggregation of commuter scores for the plurality of users.

12. The platform of claim 11, wherein the display is further configured to:
    display one or more models for improving the organization commuter score.

13. A non-transitory, tangible computer readable storage medium, encoded with processor readable instructions to perform a method for ranking one or more commute options, the method comprising:
    receiving user commute information including at least a start location and an end location;
    analyzing a plurality of commute options available to the at least one user, wherein the analyzing the plurality of commute options available comprises analyzing a plurality of modes of transportation;
    generating, based on the data about the user commute information and the analysis of the plurality of commute options available, a plurality of recommendations to the at least one user comprising at least a portion of the plurality of commute options available; and ranking the plurality of recommendations based at least in part on two or more of an estimated duration, an estimated monetary cost, and estimated carbon emissions associated with each of the plurality of recommendations.

14. The non-transitory, tangible computer readable storage medium of claim 13, wherein the analyzing the plurality of commute options available further comprises analyzing one or more routes.

15. The non-transitory, tangible computer readable storage medium of claim 13, further comprising:

creating a commuter score for each of the plurality of recommendations based on the data about one or more metrics and the analysis of the plurality of commute options available, wherein the one or more metrics comprise one or more of the estimated duration, the estimated monetary cost, and the estimated carbon emissions, wherein the commuter score comprises a numerical value; and wherein ranking the one or more recommendations is based at least in part on a respective commuter score for each of the plurality of recommendations.

16. The non-transitory, tangible computer readable storage medium of claim 13, wherein the plurality of recommendations comprise at least one recommendation for reducing each of:

time spent commuting;

money spent commuting; and carbon emissions resulting from commuting.

17. The non-transitory, tangible computer readable storage medium of claim 15, wherein the at least one user comprises a plurality of users, and wherein the plurality of users are associated with an organization, and further comprising:

creating an organization commuter score comprising an aggregation of commuter scores for the plurality of users; and displaying one or more models for improving the organization commuter score.

18. The method of claim 1, wherein the receiving user commute information further comprises receiving one or more of: a preferred commute time, one or more variables, vehicle ownership information, and one or more user preferences or plans for the at least one user.

19. The platform of claim 7, wherein the receiving user commute information further comprises receiving one or more of: a preferred commute time, one or more variables, vehicle ownership information, and one or more user preferences or plans for the at least one user.

20. The non-transitory, tangible computer readable storage medium of claim 13, wherein the receiving user commute information further comprises receiving one or more of: a preferred commute time, one or more variables, vehicle ownership information, and one or more user preferences or plans for the at least one user.

\* \* \* \* \*